(12) United States Patent
Miller et al.

(10) Patent No.: US 11,739,012 B1
(45) Date of Patent: Aug. 29, 2023

(54) AUTOMATED CHLORINATOR, SYSTEM INCLUDING THE SAME, METHODS OF MAKING AND USING THE SAME, AND SOFTWARE FOR IMPLEMENTING THE METHOD OF USING AND CONTROLLING THE CHLORINATOR AND SYSTEM

(71) Applicants: Deborah L. Miller, Fresno, CA (US);
John C. Miller, Fresno, CA (US);
Matthew Coney, Fresno, CA (US);
Brandon Nimon, Fresno, CA (US);
Armen Melidonian, Madera, CA (US)

(72) Inventors: Deborah L. Miller, Fresno, CA (US);
John C. Miller, Fresno, CA (US);
Matthew Coney, Fresno, CA (US);
Brandon Nimon, Fresno, CA (US);
Armen Melidonian, Madera, CA (US)

(73) Assignee: Deerpoint Group, Inc., Madera, CA (US)

( * ) Notice: Subject to any disclaimer, the term of this patent is extended or adjusted under 35 U.S.C. 154(b) by 0 days.

(21) Appl. No.: 17/719,615

(22) Filed: Apr. 13, 2022

(51) Int. Cl.
*C02F 1/76* (2023.01)
*H04W 4/38* (2018.01)
(Continued)

(52) U.S. Cl.
CPC .............. *C02F 1/685* (2013.01); *C02F 1/76* (2013.01); *H04W 4/38* (2018.02); *C02F 2103/42* (2013.01); *C02F 2303/04* (2013.01)

(58) Field of Classification Search
CPC .. C02F 1/685; C02F 2103/42; C02F 2303/04; C02F 1/76; H04W 4/38
(Continued)

(56) References Cited

U.S. PATENT DOCUMENTS 6,238,573 B1 * 5/2001 Miller ................... C01B 11/064
210/764
7,638,064 B1 * 12/2009 Miller ....................... C02F 1/76
210/764
(Continued)

*Primary Examiner* — Akash K Varma
(74) *Attorney, Agent, or Firm* — Andrew D. Fortney; Central California IP Group, P.C.

(57) ABSTRACT

A water treatment system, a water treatment monitoring and/or control system, and a method of monitoring and/or controlling treatment of water are disclosed. The water treatment system generally includes a water pump configured to supply water from a water source to an intake pipe, a chlorine source pump configured to supply a chlorine source from a storage vessel to a chlorine source feed line, a water flow and/or pressure switch configured to detect a positive water flow and/or pressure in the intake pipe, a chlorine flow monitor, and logic or circuitry configured to notify a user and optionally automatically disable or turn off the water pump when (1) the water flow and/or pressure switch detects the positive water flow and/or pressure in the intake pipe and (2) the chlorine source flow monitor detects either that (i) the chlorine source pump is not primed or (ii) there is no flow in the chlorine source feed line. The chlorine flow monitor is configured to determine (a) whether the chlorine source pump is primed or (ii) there is no flow of the chlorine source in the chlorine source feed line. The monitoring/control system and method generally embody one or more of the inventive concepts disclosed herein.

21 Claims, 16 Drawing Sheets

(51) Int. Cl.
*C02F 1/68* (2023.01)
*C02F 103/42* (2006.01)

(58) Field of Classification Search
USPC .......................................................... 210/754
See application file for complete search history.

(56) References Cited

U.S. PATENT DOCUMENTS

| | | |
|---|---|---|
| 8,568,506 B1 | 10/2013 | Miller et al. |
| 8,628,598 B1 | 1/2014 | Miller et al. |
| 8,690,982 B1 | 4/2014 | Miller et al. |
| 8,690,983 B1 | 4/2014 | Miller et al. |
| 8,690,984 B1 | 4/2014 | Miller et al. |
| 8,721,758 B1 | 5/2014 | Miller et al. |
| 8,721,759 B1 | 5/2014 | Miller et al. |
| 8,821,646 B1 | 9/2014 | Miller et al. |
| 8,979,969 B1 | 3/2015 | Miller et al. |
| 8,986,417 B1 | 3/2015 | Miller et al. |
| 8,986,418 B1 | 3/2015 | Miller et al. |
| 9,148,993 B1 | 10/2015 | Miller et al. |
| 9,161,489 B1 | 10/2015 | Miller et al. |
| 10,271,474 B1 | 4/2019 | Miller et al. |
| 10,645,868 B2 | 5/2020 | Miller et al. |

* cited by examiner

| time | ppm |
|---|---|
| 20YY-MM-08 19:08:19 | 0 |
| 20YY-MM-08 20:08:19 | 0 |
| 20YY-MM-08 21:08:19 | 0 |
| 20YY-MM-08 22:08:19 | 3.5 |
| 20YY-MM-08 23:08:19 | 3.4 |
| 20YY-MM-09 00:08:19 | 0 |
| 20YY-MM-09 01:08:19 | 3.6 |
| 20YY-MM-09 02:08:19 | 3.8 |
| 20YY-MM-09 03:08:19 | 0 |
| 20YY-MM-09 04:08:19 | 3.3 |
| 20YY-MM-09 05:08:19 | 3.9 |
| 20YY-MM-09 06:08:19 | 0 |
| 20YY-MM-09 07:08:19 | 0 |
| 20YY-MM-09 08:08:19 | 0 |
| 20YY-MM-09 09:08:19 | 0 |
| 20YY-MM-09 10:08:19 | 0 |
| 20YY-MM-09 11:08:19 | 3.9 |
| 20YY-MM-09 12:08:19 | 4.1 |
| 20YY-MM-09 13:08:19 | 4.1 |
| 20YY-MM-09 14:08:19 | 0 |
| 20YY-MM-09 15:08:19 | 0 |
| 20YY-MM-09 16:08:19 | 0 |
| 20YY-MM-09 17:08:19 | 0 |
| 20YY-MM-09 18:08:19 | 0 |
| 20YY-MM-09 19:08:19 | 0 |
| 20YY-MM-09 20:08:19 | 0 |
| 20YY-MM-09 21:08:19 | 4.1 |
| 20YY-MM-09 22:08:19 | 4.1 |
| 20YY-MM-09 23:08:19 | 4.1 |
| 20YY-MM-10 00:08:19 | 4.2 |
| 20YY-MM-10 01:08:19 | 4.2 |
| 20YY-MM-10 02:08:19 | 0 |
| 20YY-MM-10 03:08:19 | 4.2 |
| 20YY-MM-10 04:08:19 | 4.2 |
| 20YY-MM-10 05:08:19 | 0 |
| 20YY-MM-10 06:08:19 | 0 |
| 20YY-MM-10 07:08:19 | 0 |
| 20YY-MM-10 08:08:19 | 0 |
| 20YY-MM-10 09:08:19 | 0 |
| 20YY-MM-10 10:08:19 | 0 |

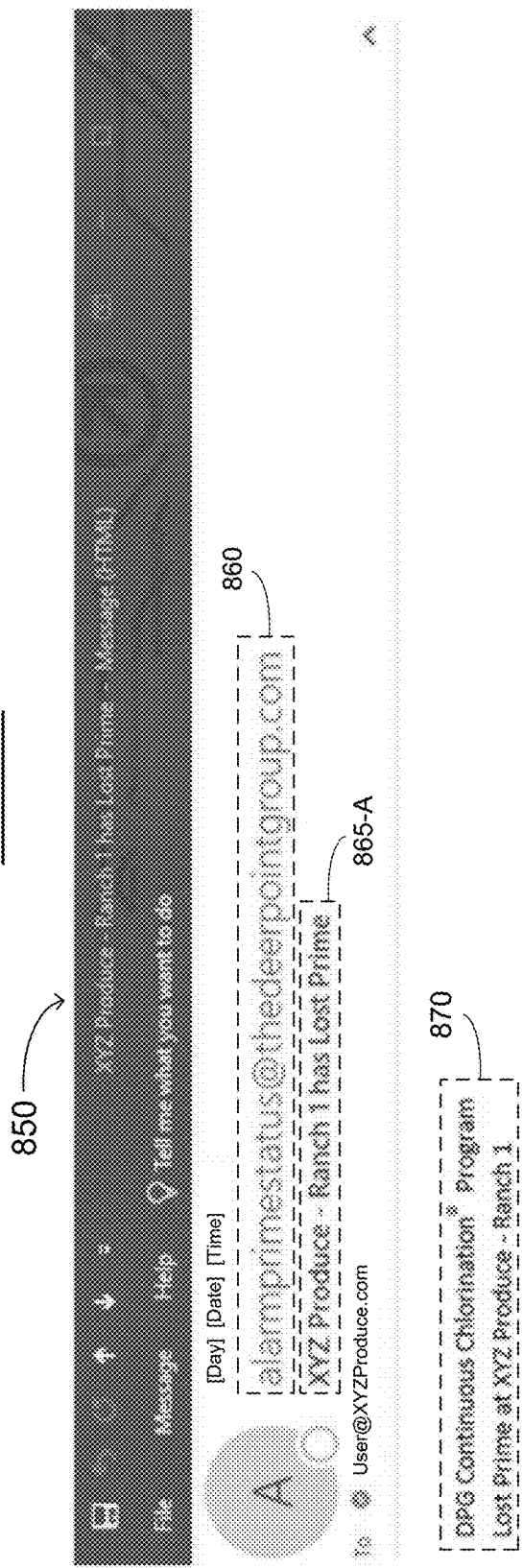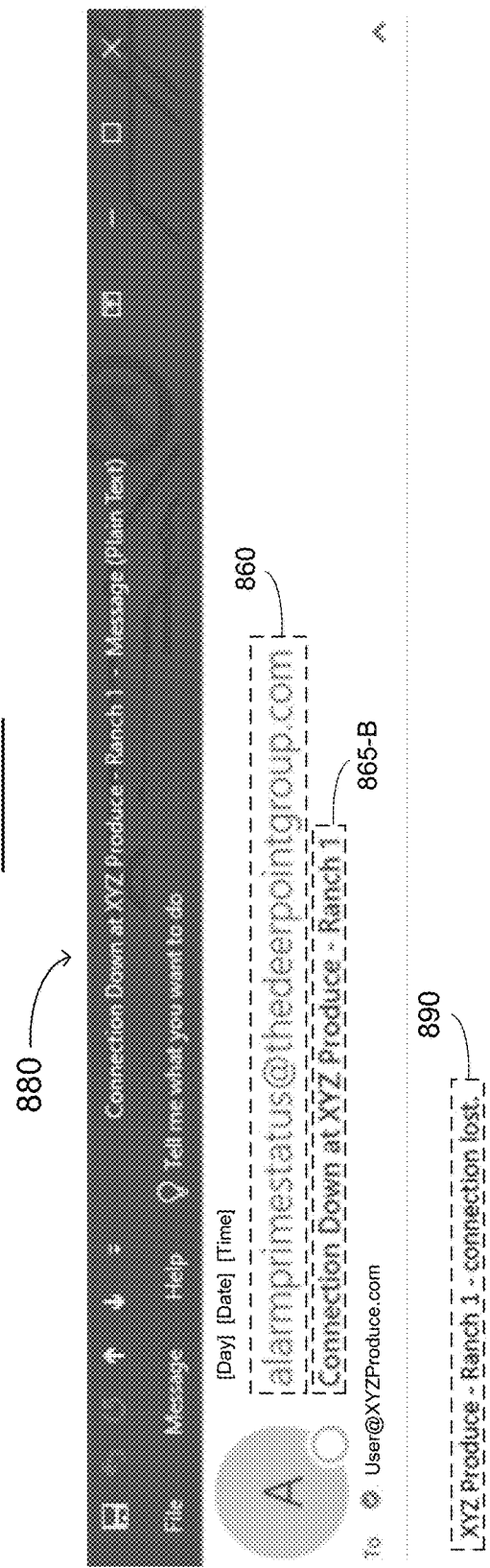

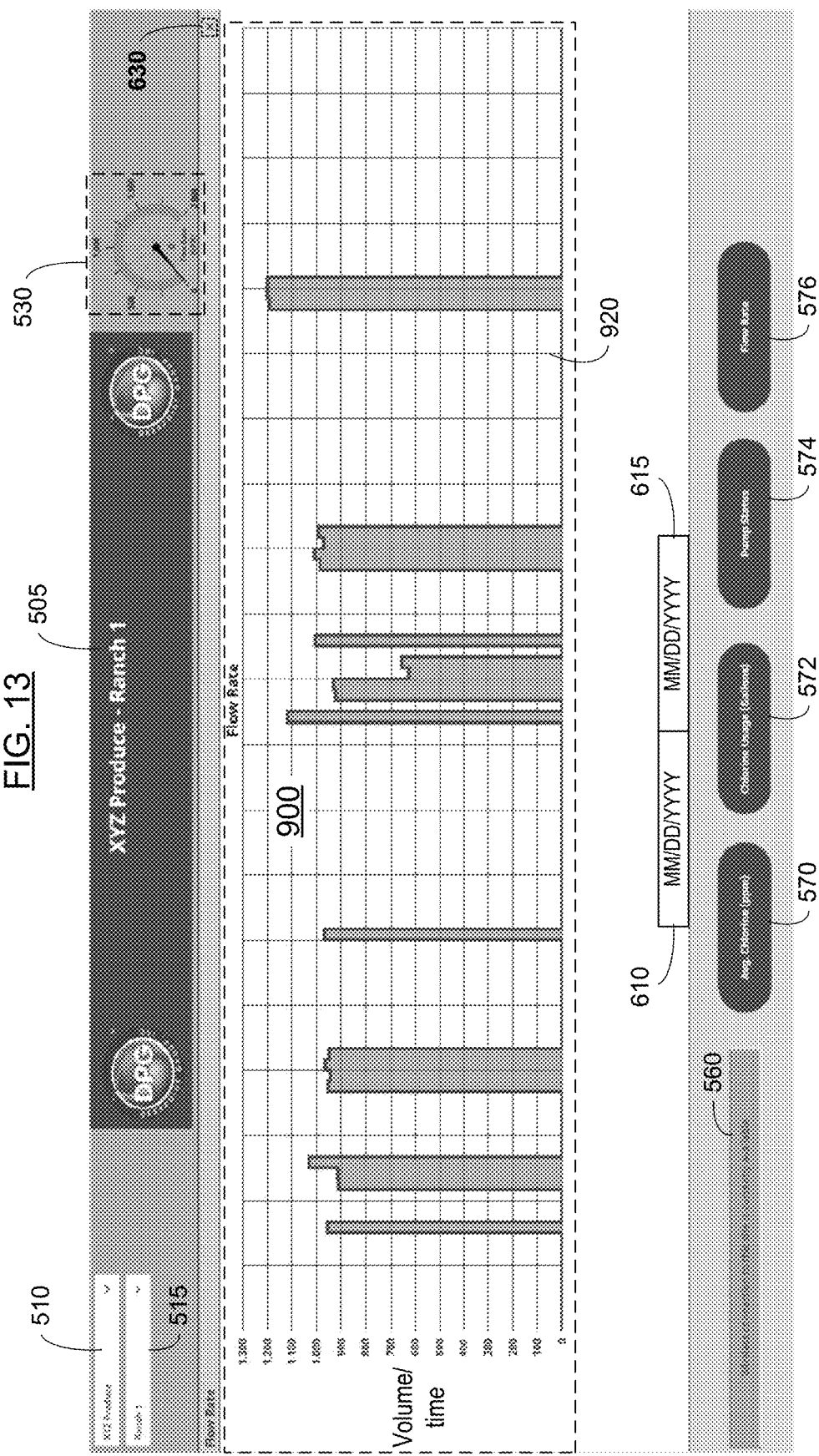

| time | flowrate |
|---|---|
| 20YY-MM-21 21:00:44 | 0 |
| 20YY-MM-21 22:00:44 | 0 |
| 20YY-MM-21 23:00:44 | 0 |
| 20YY-MM-22 00:00:44 | 0 |
| 20YY-MM-22 01:00:44 | 0 |
| 20YY-MM-22 02:00:44 | 0 |
| 20YY-MM-22 03:00:44 | 0 |
| 20YY-MM-22 04:00:44 | 949 |
| 20YY-MM-22 05:00:44 | 975 |
| 20YY-MM-22 06:00:44 | 982 |
| 20YY-MM-22 07:00:44 | 1,033 |
| 20YY-MM-22 08:00:44 | 1,045 |
| 20YY-MM-22 09:00:44 | 0 |
| 20YY-MM-22 10:00:44 | 1,061 |
| 20YY-MM-22 11:00:44 | 1,054 |
| 20YY-MM-22 12:00:44 | 0 |
| 20YY-MM-22 13:00:44 | 0 |
| 20YY-MM-22 14:00:44 | 0 |
| 20YY-MM-22 15:00:44 | 0 |
| 20YY-MM-22 16:00:44 | 0 |
| 20YY-MM-22 17:00:44 | 0 |
| 20YY-MM-22 18:00:44 | 0 |
| 20YY-MM-22 19:00:44 | 0 |
| 20YY-MM-22 20:00:44 | 0 |
| 20YY-MM-22 21:00:44 | 0 |
| 20YY-MM-22 22:00:44 | 0 |
| 20YY-MM-22 23:00:44 | 0 |
| 20YY-MM-23 00:00:44 | 0 |
| 20YY-MM-23 01:00:44 | 0 |
| 20YY-MM-23 02:00:44 | 0 |
| 20YY-MM-23 03:00:44 | 0 |
| 20YY-MM-23 04:00:44 | 0 |
| 20YY-MM-23 05:00:44 | 0 |
| 20YY-MM-23 06:00:44 | 0 |
| 20YY-MM-23 07:00:44 | 950 |
| 20YY-MM-23 08:00:44 | 946 |
| 20YY-MM-23 09:00:44 | 0 |
| 20YY-MM-23 10:00:44 | 0 |
| 20YY-MM-23 11:00:44 | 0 |
| 20YY-MM-23 12:00:44 | 0 |

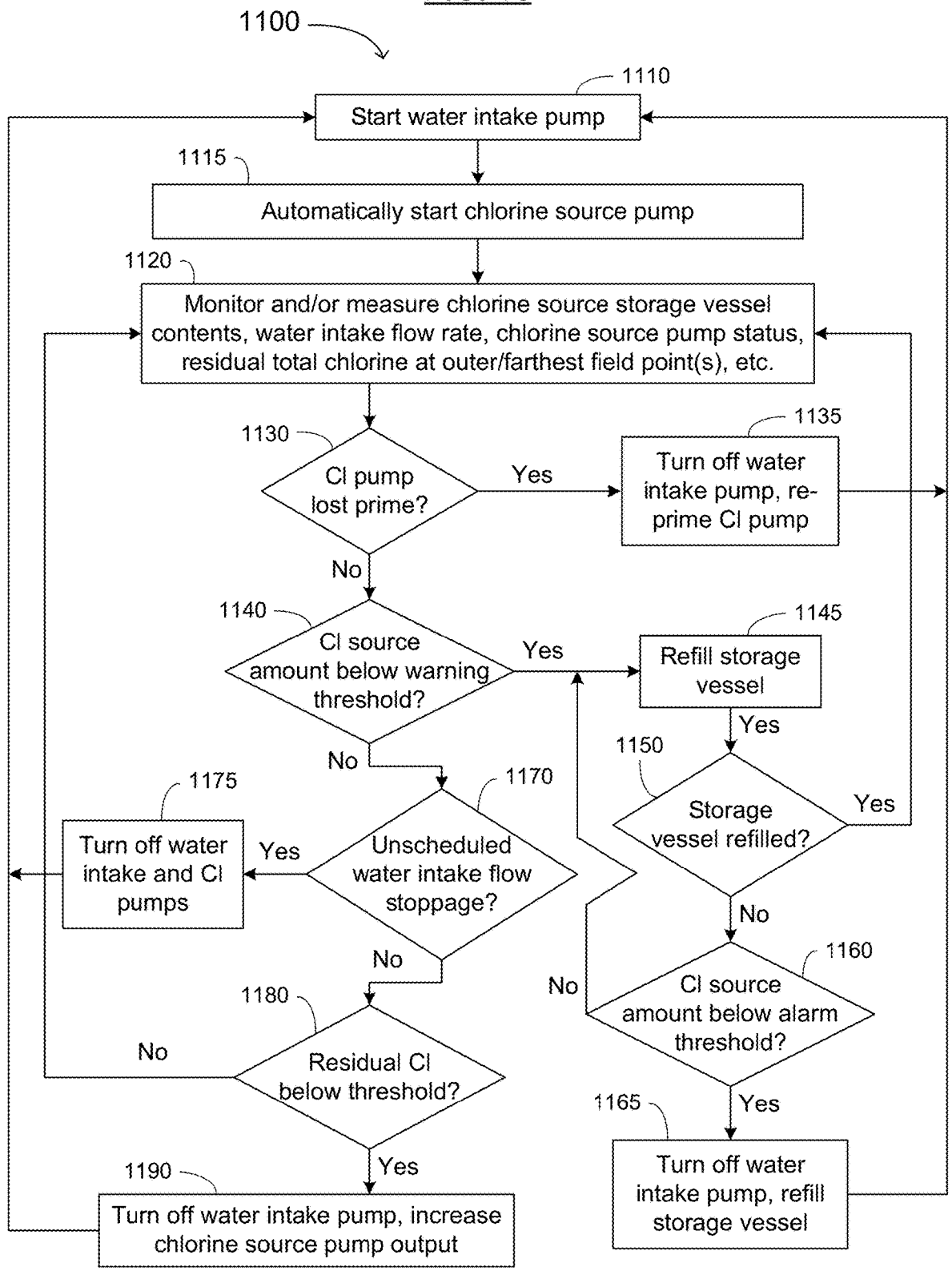

_US 11,739,012 B1_

AUTOMATED CHLORINATOR, SYSTEM INCLUDING THE SAME, METHODS OF MAKING AND USING THE SAME, AND SOFTWARE FOR IMPLEMENTING THE METHOD OF USING AND CONTROLLING THE CHLORINATOR AND SYSTEM

FIELD OF THE INVENTION

The present invention generally relates to the field of treatment of water in water supply systems. More specifically, embodiments of the present invention pertain to methods and systems for disinfecting and/or chlorinating irrigation water (e.g., for use in agriculture, municipal or industrial water supply, etc.).

DISCUSSION OF THE BACKGROUND

The addition of chlorine or chlorine compounds to water has been used for over a century to purify water. Chlorine purifies water by killing or inactivating microorganisms in the water. The most common classes of microorganisms found in typical water sources utilized for agricultural irrigation are bacteria, viruses, and protozoa. Coliforms are a group of bacteria whose presence in water is a common indicator of fecal pollution and potentially dangerous disease-causing (pathogenic) microorganisms. Coliform bacteria include *Escherichia coli*, which has been the cause of multiple food recalls and outbreaks. Microbial biofilms are populations of organisms, typically surrounded by an extracellular, polymeric slime layer, which accumulate on surfaces in an aqueous environment. Biofilms include microorganisms such as bacteria, protozoa, algae and invertebrate animals.

Recommended uses of chlorine in agricultural water treatment include the removal of bacteria and algae (disinfection), the prevention of regrowth of algae and bacteria in the agricultural water distribution system (disinfection), inhibition or prevention of root intrusion into irrigation water supply pipes, and the oxidation of iron and manganese in the water. Interference with the disinfection chlorination process may be caused by turbidity, the presence of excess chlorine-demanding inorganic compounds (e.g., iron and manganese), and high pH.

The primary sources of chlorine for water treatment are chlorine gas, calcium hypochlorite and sodium hypochlorite. Chlorine gas is inexpensive and very effective (100% available chlorine), but it is very dangerous. Due to safety concerns, the use of chlorine gas for agricultural chlorination is prohibited in many regions of California and presumably elsewhere. Sodium hypochlorite is available as an easy-to-use liquid, which has a low percentage of chlorine (6 to 12.5% available chlorine), and is therefore relatively safe (although it is corrosive). However, the high water content of commercial sodium hypochlorite solutions leads to high freight costs. Calcium hypochlorite is available as a solid with a high level of available chlorine (67%). As a solid, calcium hypochlorite may be difficult to use in a pressurized system, and the presence of calcium in alkaline water can cause plugging in drip irrigation systems.

A slug-feed approach to controlling microbiological organisms in irrigation systems is normally inadequate. Excess chlorination is undesirable because excess available chlorine in the irrigation water can adversely affect (kill) probiotics which are naturally-occurring in, or are added by the grower to, the soil. Additionally, minimizing chlorination prevents build-up of chloride concentrations in the soil. Chloride ions can be toxic to sensitive crops, and can result in undesirable decreases in crop yield or quality.

The deficiencies in the control of microorganisms in agricultural production have spawned repeated, and now well-publicized, outbreaks of food contamination and recalls in the U.S. Crops such as spinach and lettuce have been contaminated by *E. coli* during in-field production, rather than post-harvest handling. Such *E. coli* contaminations have caused severe illness and even death. One of the prime suspects of in-field crop contamination is contaminated irrigation water, which highlights a serious need to improve microorganism control in irrigation water.

FIG. 1 shows a conventional system 10 for continuous chlorination of irrigation water in the field. The system 10 is disclosed in U.S. Pat. No. 7,638,064, the relevant portions of which are incorporated herein by reference. Monitoring for residual chlorine in the field, which at minimum is done at a target outer field point such as the farthest field point 54, and optionally at various other points in the irrigation system 10, is a key component to insuring that a low, but measurable, level of available chlorine is continuously maintained throughout the entire irrigation system 10. If the chlorine is depleted upstream of the farthest field point, then no residual chlorine is detected at the farthest field point, and a failure to achieve system-wide disinfection of the irrigation water system must be presumed. On the other hand, detection of residual chlorine at the farthest field point reassures user that system-wide disinfection of the irrigation water system has been achieved. The same would be substantially true if an outer field point was used that is reasonably comparable to, but not exactly, the farthest field point. Similarly, a chlorine depletion seen at a monitoring point upstream from the farthest field point (or any outer field point) confirms a failure to achieve system-wide disinfection of the irrigation water system.

The level of water disinfection via chlorination treatment is a function of the chlorine concentration (C) and the contact time (T) of the chlorine with the microorganisms. Many irrigation systems have long runs (lengths) of main and lateral pipes in which, in any given amount of water, the contact time of the chlorine with microorganisms in that amount of water is high. Residual chlorine levels of about 0.4 ppm or more (e.g., 0.5-1.0 ppm) of free chlorine and/or total chlorine at the farthest field point have been determined and are considered to be a threshold level to ensure effective disinfection of the irrigation water in typical long irrigation system runs, as determined by testing for the presence of the target organism(s). However, each irrigation system is unique, and the residual chlorine level that realizes effective water treatment (disinfection, or another level or degree of water treatment desired by the grower) may be determined for each situation by also testing for the presence and/or level of the target organism(s) at the target outer field point. Further, in some situations, higher or lower levels of residual chlorine may be acceptable for adequate control of microorganisms, while at least controlling, if not minimizing, chlorine consumption, as discussed in U.S. Pat. No. 7,638,064 (the relevant portions of which are incorporated herein by reference).

The term "farthest field point" refers to the point along the irrigation pipeline network in the field which is farthest away in time (that is, the amount of time which elapses between water [a] passing the point of entry to the field and [b] reaching the given point). An irrigation pipeline network typically branches out into a plurality of blocks (sections), each servicing a portion of the field. Each block has an outermost point which is the farthest in pipeline distance that is reached by the irrigation water, as measured from the point the irrigation water enters the block. This is the outermost block point. Each block of a multi-block field has an outermost block point. The outermost block point that is the greatest in pipeline length from the point of entry of irrigation water to the field is the outermost field point. The outermost field point is typically, but not always, the farthest field point. For example, the time required for water to reach a given point is dependent not only on pipeline length, but also on the rate of water flow and the diameter of the pipe. Water flow rates can, and sometimes do, differ from block to block, although the pipe diameter in each block of a field is typically the same as that in other blocks. For instance, if the outermost field point is in block X, but if block Y has an outermost block point with a sufficiently long pipeline length and a sufficiently slower water flow rate, block Y's outermost block point might be the farthest field point. However, in most cases, it is not required to meticulously determine the farthest field point, or even the outermost field point, because such exactitude is often impractical. Instead, it is normally sufficient if one selects a target outer field point based on rough observations, measurements and/or estimates that appear to identify the farthest field point, or a point reasonably comparable to the farthest field point. Therefore, the determined or selected farthest field point may be the actual farthest field point, the outermost field point, or a point reasonably comparable to either.

Depending on the chlorine residual data obtained by analytical monitoring in the field, the chlorine delivery might be adjusted so that the chlorine residual at the farthest field point is at a high enough level to sufficiently kill or inactivate the microbiological species contained in the water of the irrigation system. If sufficient chlorine residuals are seen at the farthest field point, then the rest of the irrigation system must be at a residual chlorine level somewhere between that of the chlorine source addition level (which is the highest) and the chlorine residual level of the water at the farthest field point (which is the lowest). Continuous addition of a chlorine source at a level determined by the chlorine residual level at the farthest point in the irrigation system will substantially ensure effective chlorine-based disinfection of the water in the entire irrigation system, controlling any microbiological concerns.

To eliminate potentially harmful microorganisms in irrigation water, the following method may be conducted to treat the agricultural irrigation system: 1) Determine the chlorine demand of the irrigation water being used. 2) If not already in place, install a tank or vessel for storing a source of chlorine at or ahead of the point of entry of the irrigation water to the field (the runs of main and lateral pipes in the field). 3) If not already in place, install a variable delivery system for feeding the chlorine source from the tank or vessel at or ahead of the point of entry of the water to the field. 4) Calculate the desired chlorine delivery system rate based on the determined chlorine demand, the target chlorine residual, and the water flow rate. 5) Turn on the irrigation system. The delivery system will automatically begin delivering the chlorine source at or around the calculated rate based on the water flow rate, the chlorine demand and the target chlorine residual. 6) Monitor the residual chlorine at the target outer or farthest field point. 7) Depending on the actual residual chlorine value at the target outer or farthest field point, increase, decrease or maintain the output of the chlorine delivery system until the target residual chlorine level at the target outer or farthest field point is observed.

FIG. 1 shows an exemplary agricultural irrigation system 10. The irrigation system 10 provides irrigation water to the field under cultivation laid out among hills 4, 6 and 8, which themselves are not under cultivation. The source of irrigation water 20 is flanked by hills 4 and 6. Irrigation water is drawn from the irrigation water source 20 by one or more pumps 22 into a main line 32. The main line 32 branches into two lateral lines 40 and 42. Irrigation water flowing to the lateral lines 40 and 42 is controlled respectively by the first and second shut-off valves 46 and 48, each neighboring the intersection 39 of the lateral lines 40 and 42 with the main irrigation line 32. Each lateral line 40, 42 has a plurality of irrigation lines 60 branching off and stretching out along the crops (not shown). Each irrigation line 60 has a plurality of irrigation delivery points (not shown) at which irrigation water is delivered to the crops. At the intersection of each irrigation line 60 and the respective lateral line from which it stems is a riser 62 (small shut-off valve) permitting the halting of water flow to its respective irrigation line 60. Off of each lateral line is an outermost block point. The first lateral line 40 has a first outermost block point 52, and the second lateral line 42 has a second outermost block point 54. The outermost block points 52, 54 are the points along or off each lateral line that are the most remote longitudinally (i.e., as a function of pipe length) from the point where the main line 32 branches at intersection 39. The outermost block point 54 of the second lateral line 42 is the outermost field point longitudinally in the irrigation system 10, and is also the farthest field point. A chlorine delivery system 26a is installed downstream of the irrigation pump 22 and a filter 90, which filters solid debris out of the irrigation water flowing through the main water line 32.

Also shown in FIG. 1 is an alternative chlorine delivery system 26b, which is positioned downstream of the filter 90. The demand for chlorine to be supplied by the chlorine delivery system 26b does not include the chlorine-demand contribution of the solid debris being filtered out of the irrigation water by the filter 90. The filter 90 between the source of irrigation water and the field removes debris, including small particles and some bio-contaminants and other materials which contribute to the chlorine demand when the chlorine demand is measured (upstream) of the filter, as it is in the case of chlorine delivery system 26a. Only one chlorine delivery system, either system 26a or 26b, would normally be installed and used.

FIG. 1 also shows a first analytical station 80, adapted for determining the chlorine demand of the water upstream of the point of irrigation water entry into the field, and a second analytical station 82, adapted for determining the chlorine residual level of the irrigation water at the farthest field point.

Nearly all irrigation systems experience flow-rate differentials, depending on the block to which the irrigation water is flowing. This phenomenon normally reflects differences between blocks, which differences include the size (in acres or other area units) of the blocks, the type and number of active irrigation water delivery-point devices within the blocks, as well as the elevation of the blocks, and in some instances the water pressure of the system. In the instances of irrigation systems having no flow-rate differential of any significance beyond the on/off conditions (zero flow rate when the water-flow system is off, and a single, substantially consistent or constant flow rate when the water-flow system is on), there is no need to continuously track the flow rate with a flow meter or the like. Instead, simpler means for determining the flow rate past the chlorine delivery system (when the water-flow system is on) can be used. For instance, the flow rate often can be determined using a simple timer, and the on/off variation of flow rate can be determined using a pressure sensor or flow sensor.

However, problems can arise in the system 10. For example, the chlorine delivery systems 26a and 26b generally include a small pump to supply the chlorine source to the irrigation water in the main line 32. If the pump does not supply the chlorine source to the irrigation water for any reason (e.g., the pump loses its prime), a technician must be called to the field to identify and correct the problem. In the meantime, potentially contaminated water may have been provided to the field. Therefore, a need exists for a chlorine delivery system that, when chlorine is not supplied to the irrigation water, automatically notifies responsible personnel, and optionally, automatically turns off the irrigation water supply.

In addition, in the system 10, a technician must operate the second analytical station 82 to determine the residual chlorine level of the irrigation water at the farthest field point. If a change must be made in the supply rate of the chlorine source, the same or a different technician must make adjustments to the chlorine delivery system 26a or 26b. A demand also exists for a chlorine delivery system in which the residual chlorine level (e.g., at the farthest field point and possibly other points in the irrigation system 10) can be remotely monitored, as well as a system in which changes or adjustments in the supply rate of the chlorine source can be made remotely.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to systems and methods for water treatment and monitoring and/or control of the treatment of water (e.g., disinfection of an agricultural, industrial or municipal water supply in one or more pipes). The water treatment system generally comprises a water pump configured to supply water from a water source to an intake pipe, a chlorine source pump configured to supply a chlorine source from a storage vessel to a chlorine source feed line, a water flow and/or pressure switch configured to detect a positive water flow and/or pressure in the intake pipe, a chlorine flow monitor configured to detect (i) a prime status of the chlorine source pump or (ii) a flow of the chlorine source in the chlorine source feed line, and logic or circuitry configured to (a) receive one or more signals from each of the water flow and/or pressure switch and the chlorine flow monitor, and (b) notify one or more users and automatically disable or turn off the water pump when (1) the water flow and/or pressure switch detects the positive water flow and/or pressure in the intake pipe and (2) the chlorine source flow monitor detects either that (i) the prime status of the chlorine source pump is not primed or (ii) there is no flow in the chlorine source feed line. The chlorine source feed line providing the chlorine source to the intake pipe. The logic or circuitry may comprise a programmable logic controller, embedded logic circuitry, a microcontroller or microprocessor, a programmable logic device such as a field programmable gate array, etc.

In some embodiments, the positive water flow and/or pressure in the intake pipe is the positive water flow. In such embodiments, the system may further comprise a water flow sensor configured to provide a flow rate signal (e.g., a flow rate value) corresponding to the positive water flow in the intake pipe to the logic or circuitry, the water flow signal may have a value corresponding to the water flow rate, and the logic or circuitry may instruct the chlorine source pump to provide the chlorine source to the chlorine source feed line at a feed rate dependent on the water flow rate and a target concentration of the chlorine source in the water (e.g., in the intake pipe and/or downstream therefrom).

In other or further embodiments, the water treatment system may further comprise a remote computer or server, configured to receive and display information from the logic or circuitry regarding the water flow and/or pressure in the intake pipe, the water flow rate, the chlorine feed rate, and the prime status. In such embodiments, the water treatment system may also further comprise a wireless modem or gateway configured to wirelessly communicate the information from the logic or circuitry to the remote computer or server. Alternatively, the remote computer or server may have a wired electrical connection to a wireless transmitter and/or receiver configured to wirelessly communicate with the wireless modem or gateway. In even further embodiments, the remote computer or server (or the wireless transmitter) is further configured to wirelessly transmit settings information to the logic or circuitry. The settings information may comprise a pulse rate or pulse frequency for the chlorine source pump and/or a scale factor. The scale factor may correspond to the target concentration of the chlorine source in the water (e.g., in the intake pipe or downstream therefrom).

In some embodiments, the water treatment system may further comprise a level sensor configured to determine a level of the chlorine source in the storage vessel and provide a chlorine level signal corresponding to the level of the chlorine source in the storage vessel to the logic or circuitry. In such embodiments, the logic or circuitry may be further configured to determine an amount of the chlorine source in the storage vessel from the chlorine level signal.

In some embodiments, the water treatment system may further comprise a pulse controller configured to control a pulse or stroke rate of the chlorine source pump, and/or a pulse volume control configured to control a volume of each pulse or stroke of the chlorine source pump. The pulse or stroke rate of the chlorine source pump may be determined in accordance with the flow rate of the water through the intake pipe (e.g., in units volume of the water flowing through the intake pipe per pulse or stroke of the chlorine source pump). The units volume of water may be liters or gallons.

In some embodiments of the water treatment system, the intake pipe may comprise a water source intake pipe configured to receive the water from the water pump, one or more filters configured to remove particulate matter (e.g., having a predetermined minimum size) from the water (e.g., in the water source intake pipe), and a treated water supply pipe configured to supply water from the filter to a downstream location, such as an agricultural field, an industrial facility such as a factory, or a municipal water supply pipe. In such embodiments, the chlorine source feed line may provide the chlorine source to the treated water supply pipe.

Another aspect of the present invention concerns a water treatment monitoring and/or control system, comprising a remote computer or server, a wireless modem or gateway, and logic or circuitry similar to that in the present water treatment system. The logic or circuitry is configured to (1) receive one or more signals from each of (i) a water flow and/or pressure switch configured to detect a positive water flow and/or pressure in an intake pipe, (ii) a chlorine source flow monitor configured to detect (a) a prime status of a chlorine source pump or (b) a flow of a chlorine source in a chlorine source feed line configured to receive the chlorine source from the chlorine source pump, and (iii) a water flow sensor configured to determine a water flow rate from the positive water flow in the intake pipe, and (2) notify one or more users when (a) the water flow and/or pressure switch detects the positive water flow and/or pressure in the intake pipe and (b) the chlorine source flow monitor detects either that (i) the prime status of the chlorine source pump is not primed or (ii) there is no flow in the chlorine source feed line. The remote computer or server is configured to receive and display information from the logic or circuitry regarding the water flow and/or pressure in the intake pipe, the water flow rate, the chlorine feed rate, and the prime status. The wireless modem or gateway is configured to wirelessly communicate information (e.g., data and/or instructions in the form of one or more wireless signals) between the logic or circuitry and the remote computer or server.

In some embodiments of the water treatment monitoring and/or control system, the logic or circuitry may be further configured to instruct the chlorine source pump to provide the chlorine source to the chlorine source feed line at a feed rate dependent on the water flow rate and a target concentration of the chlorine source in the water in the intake pipe. In other or further embodiments, the water treatment monitoring and/or control system may further comprise (i) a pulse controller configured to control a pulse or stroke rate of the chlorine source pump and/or (ii) a pulse volume control configured to control a volume of each pulse or stroke of the chlorine source pump.

In some embodiments of the water treatment monitoring and/or control system, the logic or circuitry may be further configured to receive a chlorine level signal from a level sensor configured to determine a level of the chlorine source in a storage vessel and determine an amount of the chlorine source in the storage vessel from the chlorine level signal. In other or further embodiments, the remote computer or server is further configured to wirelessly transmit settings information to the logic or circuitry. As for the water treatment system, the settings information may comprise a pulse rate or pulse frequency for the chlorine source pump and/or a scale factor. The scale factor may correspond to the target concentration of the chlorine source in the water in the intake pipe.

Another aspect of the present invention concerns a method of monitoring and/or controlling treatment of water, comprising detecting a positive water flow and/or pressure in an intake pipe, supplying a chlorine source from a storage vessel through a chlorine source feed line to the intake pipe when the positive water flow and/or pressure is detected in the intake pipe, and notifying one or more users when (a) the positive water flow and/or pressure in the intake pipe is not detected and (b) either (i) a chlorine source pump providing the chlorine source to the chlorine source feed line is not primed or (ii) there is no flow of the chlorine source in the chlorine source feed line.

In some embodiments, as for the water treatment system, the positive water flow and/or pressure in the intake pipe is the positive water flow, and the method further comprises (i) determining a water flow rate corresponding to the positive water flow in the intake pipe and/or (ii) instructing the chlorine source pump to provide the chlorine source to the chlorine source feed line at a feed rate dependent on the water flow rate and a target concentration of the chlorine source in the water in the intake pipe.

In some embodiments, the method may further comprise receiving and displaying information corresponding to the water flow rate, the chlorine feed rate, and whether the chlorine source pump is primed or not primed on a remote computer or server. The information may be transmitted wirelessly to the remote computer or server (or to a wireless receiver electrically connected to the remote computer or server), and the remote computer or server may wirelessly transmit settings information to logic or circuitry configured to control the chlorine source pump, wherein the settings information comprises a pulse rate or pulse frequency for the chlorine source pump and a scale factor, the scale factor corresponding to the target concentration of the chlorine source in the water in the intake pipe.

In other or further embodiments, the method may further comprise pumping water into or through the intake pipe with a water pump. In such embodiments, the logic or circuitry may be further configured to automatically disable or turn off the water pump when either (i) the chlorine source pump is not primed or (ii) there is no flow of the chlorine source in the chlorine source feed line.

Another aspect of the present invention concerns a method of controlling a supply of a chlorine source to a water supply, comprising detecting a positive water flow and/or pressure in a water intake pipe, turning on a chlorine source pump to supply the chlorine source from a storage vessel through a chlorine source feed line to the water intake pipe when the positive water flow and/or pressure is detected in the intake pipe, and turning off the chlorine source pump to discontinue the supply of the chlorine source when (a) the positive water flow and/or pressure in the intake pipe is not detected and (b) either (i) the chlorine source pump is not primed or (ii) there is no flow of the chlorine source in the chlorine source feed line.

Another aspect of the present invention concerns a non-transitory computer-readable medium, comprising a set of instructions encoded thereon and adapted to practice the method of monitoring and/or controlling treatment of water and/or the method of controlling the supply of the chlorine source to the water supply.

In many respects, the method may generally comprise those steps or actions that include one or more functions of the system. Similarly, the computer-readable medium generally comprises a set of instructions (e.g., software) practicing one or more embodiments of the present method, or controlling and/or operating one or more of the inventive systems disclosed herein.

The present invention advantageously provides quick or immediate correction of under- or over-chlorination of irrigation water, enabling fast or real-time decontamination of biological contaminants that might otherwise raise health and food safety issues. The present invention also advantageously provides systems, methods and software that lower the costs of water treatment, especially as a result of reducing or minimizing manpower, maintenance time/delays, the use of chlorine-containing chemicals, and/or effort on both the water treatment service provider and the user of the irrigation equipment. In addition, the present invention enables one to manage a greater volume of irrigation water and/or a greater irrigation field area than in the absence of the invention.

These and other advantages of the present invention will become readily apparent from the detailed description of various embodiments below.

BRIEF DESCRIPTION OF THE DRAWINGS

FIG. 9 is an exemplary chart or table showing actual average chlorine feed rate values in an example of the present water treatment and/or monitoring system.

FIGS. 12A-B are exemplary alarm messages that may be automatically sent by the present automated water treatment system monitoring software, in accordance with embodiments of the present invention.

FIG. 13 is an exemplary graph of the water intake flow rate over between two points in time, in accordance with an embodiment of the present water treatment and/or monitoring system.

FIG. 14 is an exemplary chart of actual water intake flow rate values in the exemplary irrigation system between two points in time, in accordance with an embodiment of the present water treatment and/or monitoring system.

FIG. 16 is a flow chart for an exemplary automated and/or continuous method of operating, monitoring and maintaining an irrigation and water treatment system, in accordance with embodiments of the present invention.

DETAILED DESCRIPTION

Figure 1:
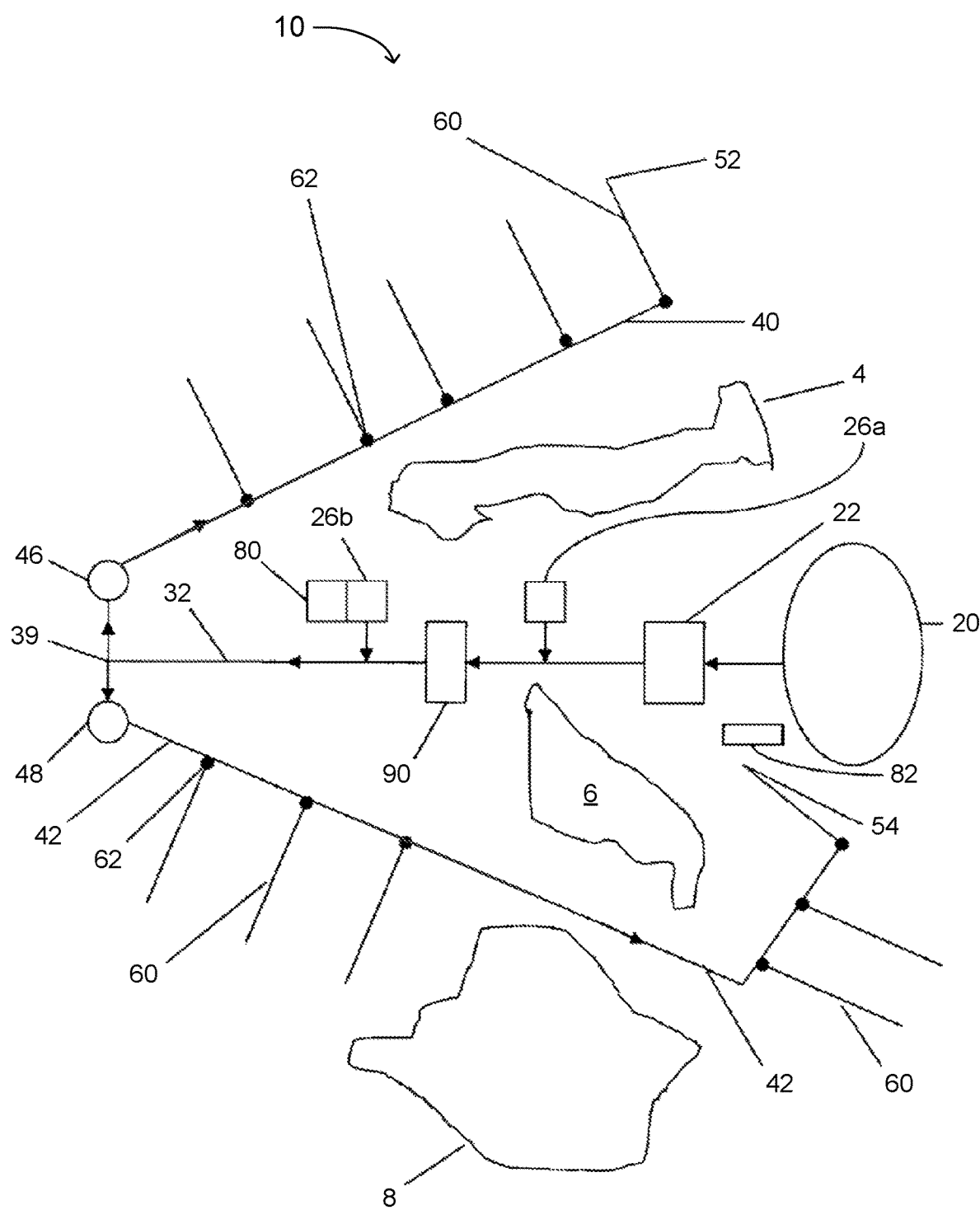
FIG. 1 is a diagram showing a conventional irrigation system adapted in part to monitor and continuously supply chlorine thereto.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

Some portions of the detailed descriptions which follow are presented in terms of processes, procedures, logic blocks, functional blocks, processing, and other symbolic representations of operations on code, data bits, data streams or waveforms within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming" or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

For the sake of convenience and simplicity, the terms "tank," "container," and "vessel" are generally used interchangeably herein, and the use of one such term includes the others (unless the context of use clearly indicates otherwise), but these terms are generally given their art-recognized meanings. The terms "chlorine source" and "chlorine" may be used interchangeably herein, but the term "chlorine source" refers to a chemical compound or formulation that provides molecular chlorine ($Cl_2$) under the conditions of its use (e.g., in situ) in the present system(s) and method(s). In addition, for convenience and simplicity, the terms "connected to," "coupled with," "coupled to," and "in communication with," may be used interchangeably and include both direct and indirect connections, couplings, and communication(s), but these terms are also generally given their art-recognized meanings.

Also, for convenience and simplicity, the terms "part," "portion," "section" and "region" may be used interchangeably, but these terms are also generally given their art-recognized meanings. Also, unless indicated otherwise from the context of its use herein, the terms "known," "fixed," "given," "set," "certain" and "predetermined" generally refer to a value, quantity, parameter, constraint, condition, state, process, procedure, method, practice, or combination thereof that is, in theory, variable, but is typically set in advance and not varied thereafter when in use, unless changes in conditions warrant a change or the variation.

Furthermore, in the context of this application, the terms "wire," "wiring," "line," "signal," "conductor" and "bus" refer to any known structure, construction, arrangement, technique, method and/or process for physically transferring a signal from one point in a circuit to another. Similarly, for convenience and simplicity, the terms "time," "timing," "rate," "period" and "frequency" are, in general, interchangeable and may be used interchangeably herein, but are generally given their art-recognized meanings. Also, for convenience and simplicity, the terms "data," "data stream," "waveform" and "information" may be used interchangeably, but these terms are generally given their art-recognized meanings herein.

The present invention continuously disinfects agricultural water, particularly agricultural water for irrigation, by chlorination. Among the purposes of such disinfection are the sanitation of coliform and other harmful bacteria and the prevention of plugging from biofilms and algae in drip irrigation systems. Continuous chlorination at a dosage determined and/or maintained by the present invention is generally considered to be preventive or maintenance chlorination. Shock chlorination treatments are used for emergency and other critical need situations in canals, reservoirs, and irrigation systems. Shock treatment at higher rates of chlorination than those used for prevention or maintenance are typically employed during extreme conditions, and may be considered to be a remediation mode of chlorination.

The invention, in its various aspects, will be explained in greater detail below with regard to exemplary embodiments.

An Exemplary System for Automatically and Continuously Chlorinating Irrigation Water In part, the present invention concerns a system for automatically and continuously disinfecting and/or sanitizing irrigation water, thereby providing biologically-safe water for the irrigation of crops of interest. In its simplest form, the present system includes a chlorine source, a pump configured to supply the chlorine source to the irrigation water, a controller configured to continuously maintain or adjust an amount of the chlorine source supplied to the irrigation water by the pump so that the chlorine source is present in the irrigation water at a level or concentration that meets, and typically exceeds, the chlorine demand of the irrigation water and (2) turn off or otherwise stop a supply of the irrigation water when the chlorine source is not supplied, an apparatus configured to analyze and/or monitor the level or concentration of residual chlorine in the irrigation water at a target outer (e.g., farthest) field point, a transmitter configured to transmit information from the controller and/or the apparatus to a remote monitoring station, and a receiver configured to receive data and/or instructions from the remote monitoring station. Together, the transmitter and receiver may function as a modem or "gateway." Additional embodiments of the present system may further include a source of irrigation water (e.g., a well, a pond, a canal, a man-made reservoir, etc.), one or more irrigation water supply pipes, one or more filters, one or more sensors, etc.

Figure 2:
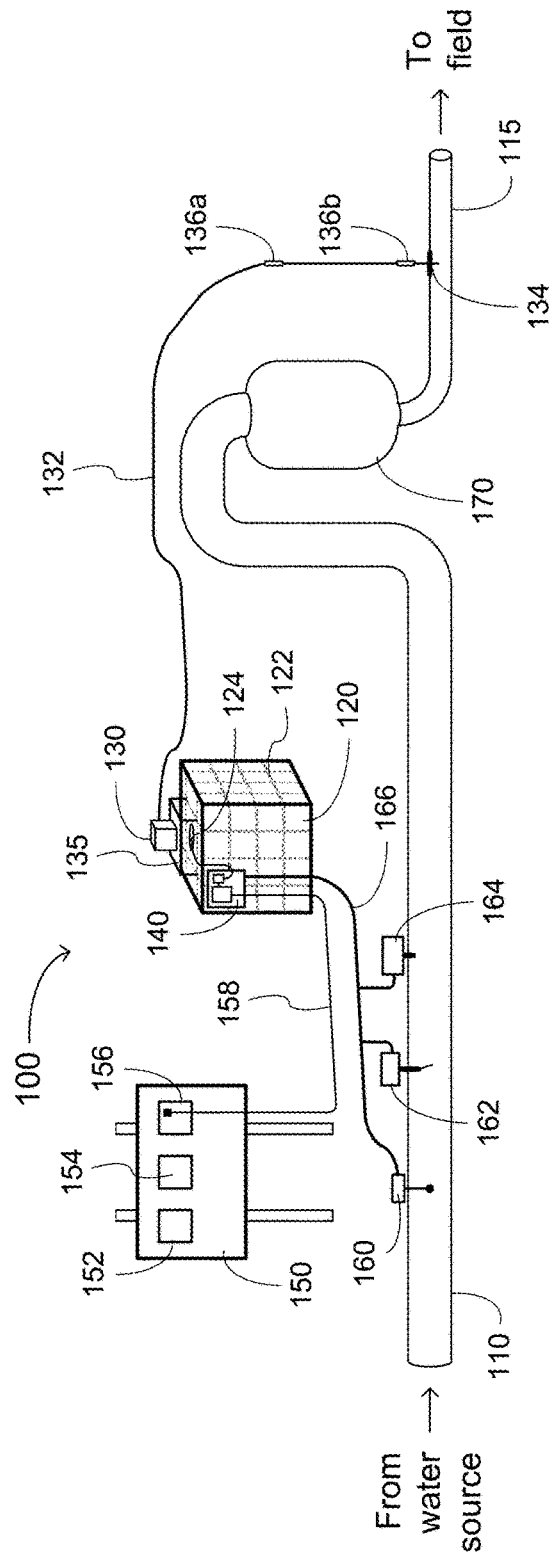
FIG. 2 is a diagram showing components of an exemplary irrigation system according to one or more embodiments of the present invention.

FIG. 2 shows a first exemplary system 100 for automatically and/or continuously treating irrigation water according to one or more embodiments of the present invention. The system 100 includes a water intake pipe 110, a treated irrigation water supply pipe 115, a storage vessel 120 configured to contain a chlorine source, a housing 130 for a pump (FIG. 3) that is configured to supply the chlorine source to the irrigation water through a chlorine supply line 132 and a chlorine injector 134, a control board 140 including a control panel (see FIG. 4) with a controller therein configured to continuously maintain or adjust an amount of the chlorine source supplied to the irrigation water by the pump, a power supply/control board 150 containing one or more power converters/controllers 152, 154 and an electrical panel 156, a plurality of sensors 160, 162 and 164, and one or more optional filters 170. These components will be discussed in greater detail below.

The intake pipe 110 provides untreated irrigation water to the system and is also known as a main line. It is typically the pipe in the system 100 with the largest diameter. The treated irrigation water supply pipe 115 typically has the same diameter as the intake pipe 110. It carries water from a water source such as a well or a booster pump (not shown) to a water treatment system such as the system 100 for irrigating an agricultural field. The most common sources of agricultural irrigation water are reservoirs, lakes, ponds, canals, streams, rivers, wells, water recycled from other uses, and combinations thereof. All of these sources have their own particular characteristic biological contaminants and levels of contamination. Embodiments of the present invention can include identifying the level and/or type of biological contamination, and providing a level or concentration of the chlorine source sufficient to disinfect and/or sanitize the irrigation water from the corresponding water source.

The storage vessel 120 contains, holds and/or stores the chlorine source. In some embodiments, the storage vessel is a small tank or "tote" in the agriculture industry. A tote is typically a sealed polyethylene container, capable of storing 200-400 gallons (800-1600 liters) of liquid. However, in most embodiments, the storage vessel 120 may comprise any material(s) that are resistant to corrosion from the chlorine source, and may have a storage capacity of from 5 gallons (20 liters) to 10,000 gallons (38,000 liters).

The chlorine source is typically a chemical that provides molecular chlorine ($Cl_2$) in aqueous solution (e.g., in situ). In most embodiments, chlorine sources for the treatment of irrigation water in an agricultural environment (as well as for treatment of municipal or industrial water) include chlorine gas, chlorine oxides, and hypochlorite salts. Typically, free chlorine (molecular chlorine, $Cl_2$) forms in equilibrium with other species when a chlorine oxide or a hypochlorite salt is in water.

The use of chlorine gas, although very economical, poses a severe safety risk, namely the possibility of a deadly release of the poisonous chlorine gas if the containment tank ruptures or containment is otherwise breached. This safety risk has eliminated the use of chlorine gas for agricultural chlorination purposes in almost all but the most remote locations. Many areas of the U.S. have banned its use.

Chlorine oxides include dichlorine monoxide, chlorine dioxide, and hypochlorous acid (HOCl). Dichlorine monoxide is an inorganic compound with the molecular formula $Cl_2O$. Chemically, it is a member of the chlorine oxides, as well as being the anhydride of hypochlorous acid. It is a strong oxidizer and chlorinating agent. Dichlorine monoxide is highly soluble in water, where it exists in an equilibrium with hypochlorous acid (HOCl). Hypochlorous acid is stable and is highly microbicidal, having activity against bacteria, viruses, algae and fungi.

Chlorine dioxide does not hydrolyze when it enters water, and is usually handled as a dissolved gas in solution in water. It has been widely used for bleaching purposes in the paper industry, and for treatment of drinking water. One of the most important qualities of chlorine dioxide is its high water solubility, especially in cold water. Chlorine dioxide is approximately 10 times more soluble in water than molecular chlorine. Chlorine dioxide has high efficacy against bacteria, fungi, yeasts, molds, viruses, algae and protozoa. It has little to no effect on humans, animals and fish.

Among the hypochlorite salts, aqueous sodium hypochlorite (NaOCl, or bleach) is the best known, but its relatively high water content (typically 87.5% or more) makes the costs of shipping and storage somewhat undesirable. Aqueous solutions of sodium hypochlorite are readily available and, in comparison to chlorine gas, are much safer to use. A disadvantage of sodium hypochlorite is that it is only available in concentrations between 6 percent (household bleach) and 12.5 percent (industrial bleach). The sodium hypochlorite solution is so dilute that its shipping costs are, or at least approach being, prohibitive. In addition, relatively large storage tanks are needed to provide a solution with an equivalent chlorine level for treatment of an irrigation system. Another disadvantage of sodium hypochlorite for treating irrigation water is sodium ions, which are undesirable for some crops.

Lithium hypochlorite (LiOCl), calcium hypochlorite (Ca[OCl]$_2$) and barium hypochlorite (Ba[OCl]$_2$) have been isolated as pure anhydrous compounds, and are suitable substitutes for sodium hypochlorite. All are solids, except sodium hypochlorite. Magnesium hypochlorite (Mg[OCl]$_2$) may also be commercially available in solid form. Other hypochlorite salts (e.g., potassium hypochlorite) can be produced as aqueous solutions. In general, the greater the dilution (i.e., water content) of the hypochlorite salt, the greater its stability.

Potassium hypochlorite has the advantage of providing a source of potassium, a generally essential nutrient for many crops, to the water. Potassium hypochlorite (KOCl) is used in variable concentrations, often diluted in water (e.g., as a 12.5 wt. % solution) and often accompanied by potassium chloride. Potassium hypochlorite is produced by the reaction of chlorine with a solution of potassium hydroxide or by electrolysis of potassium chloride solution. With both methods, the reaction mixture should be kept cold (e.g., to prevent formation of potassium chlorate). Potassium hypochlorite is used for sanitizing surfaces as well as disinfecting drinking water. Because its degradation leaves behind potassium chloride rather than sodium chloride, its use may be beneficial in agriculture, where potassium is commonly added to soil as a fertilizer.

Calcium hypochlorite is also readily available and much safer to use than solutions of sodium hypochlorite. It is commercially available as a solid, which typically contains 67 percent available chlorine. Its high-chlorine solid form is much easier and less costly to transport and store than the relatively dilute sodium hypochlorite solutions. Use of calcium hypochlorite in irrigation systems is known (see U.S. Pat. Nos. 7,638,064 and 6,238,573, each to to Miller et al., of which the relevant contents of each are incorporated herein by reference).

Figure 3:
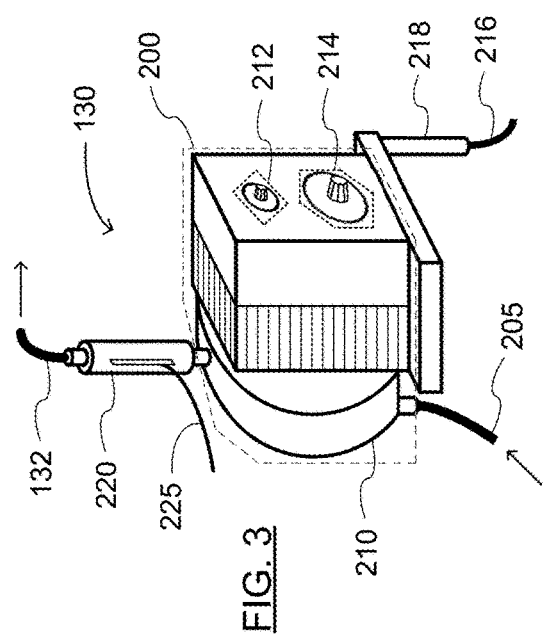
FIG. 3 is a diagram of an exemplary pump for use in the exemplary irrigation system shown in FIG. 2.

The system 100 supplies the chlorine source to the irrigation water using the pump 130, which may be secured to a stand or table 135 mounted on the storage vessel 120 (or to a frame 122 surrounding and/or protecting the storage vessel 120). An example of the pump 130 is shown in FIG. 3. The pump 130 comprises a dosing pump 200, a diaphragm section 210, and a chlorine flow monitor 220. The dosing pump 200 pulls or draws the chlorine source from the storage vessel 120 through a tube 205, and delivers the chlorine source to the irrigation water supply line 115 through tube or pipe 132. Alternatively, the chlorine source can be injected into the water intake pipe 110 (i.e., the injector 134 can be placed in the water intake pipe 110, upstream of the filter 170), but additional chlorine source material must be added in such an alternative to account for the chlorine consumed by the materials removed by the filter 170. In the embodiment shown in FIG. 3, the dosing pump 200 receives at least some control signals from a pulse controller (see the discussion of FIG. 4 below) via a cable 216, connected to the pump 200 by a 4-pin connector 218.

The chlorine source dosing rate and amount may be controlled by the stroke knob 214 and either the pulse controller 260 (FIG. 4) or the flow rate knob 212. The pulse controller 260 control the pulse rate of the dosing pump 200 (e.g., in units of gallons or liters of irrigation water passing through the intake pipe 110 per pulse or stroke). Typically, the dosing pump 200 makes one pulse or stroke for every 10-200 gallons (40-800 liters, or any value or range of values therein) of irrigation water to be treated. The pulse rate, which may be in the range of 1-240 pulses/minute (or any value or range of values therein, such as 1-100 pulses/min), may be set by the speed (e.g., flow rate) knob 212, and the stroke volume, which may be in the range of 0.05-5 ml/stroke, may be set by the stroke knob 214. Typically, only one of the pulse controller 260 or the flow rate controller associated with the knob 212 is used. The pulse controller 260 is advantageous for its ability to reliably provide a target concentration of the chlorine source to the irrigation water when the water flow rate changes.

The chlorine flow monitor 220 may comprise a magnetic switch sensor that determines the status of the dosing pump 200 (e.g. primed ["on"] or not primed ["off"]) and sends a signal to the programmable logic controller (see FIG. 5) on the system control board 140 indicating the pump status. Such a flow monitor is available commercially (e.g., a Digi-Pulse™ Series FM-PRO, FM-200 or FM-300 flow monitor, available from Flomotion Systems Inc., Middleport, N.Y.). The signal may be sent on or over an electrical wire or cable 225.

The chlorine source is supplied to the irrigation water through the chlorine supply line 132 and the chlorine injector 134 (FIG. 2). The injector 134 is a device that is inserted into the irrigation water supply line or pipe 115 that sprays or injects the chlorine source into the supply line or pipe 115. Alternatively, the injector 134 may sprays or injects the chlorine source into the water intake pipe 110, as discussed elsewhere herein.

Figure 4:
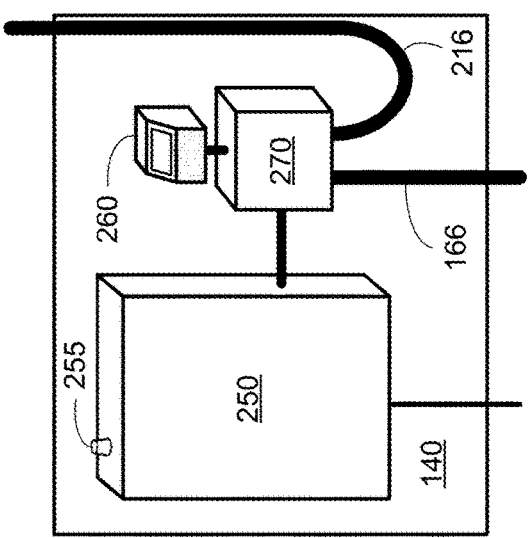
FIG. 4 is a diagram of an exemplary control panel for use in the exemplary irrigation system shown in FIG. 2.

The exemplary automatic and/or continuous chlorination system 100 is controlled by the control board 140, which is configured to automatically and/or continuously maintain or adjust parameters and/or settings on the pump 200 to deliver a calculated and/or predetermined amount of the chlorine source to the irrigation water. FIG. 4 shows an exemplary control board 140, including a control panel 250 with a programmable logic controller (PLC) therein (discussed below with regard to FIG. 5) that receives inputs from various sensors and indicators in the system 100, a pulse controller and flow indicator 260 configured to control the pulses or strokes of the pump 200 and provide a predetermined amount of the chlorine source to the irrigation water per unit volume of the irrigation water moving through the water intake pipe 110 (and/or provide the filtered irrigation water in the treated water pipe 115 with a predetermined or target concentration of the chlorine source) and a junction box 270 configured to electrically connect various components of the water treatment system with each other.

The control panel 250 also includes an antenna 255 for receiving and transmitting wireless communications and a modem or gateway (FIG. 5), which transmits data to a remote control and/or communications station (e.g., a remote server, to which a remote user or monitor has access), receives settings (e.g., parametric settings), data and instructions from the remote control and/or communications station, through the antenna 255. The PLC communicates with the modem or gateway to provide data from the system to the remote server and to obtain settings, data and instructions from the remote server. The control panel 250 may also have a power converter and/or power supply (FIG. 5) therein. The electronics in the control panel 250 may be powered by AC power, and in case of a loss of the AC power, by a battery backup (e.g., with a converter configured to convert the DC power from the battery to AC power for the electronics). The control panel 250 may further include a visual indictor (e.g., a colored light; not shown), which indicates when the control panel 250 is active (e.g., power is being provided thereto)

The junction box 270 receives an input from an ultrasonic sensor (not shown) that determines the distance of the surface of the chlorine source from the top of the storage vessel 120, and the PLC in the control panel 250 calculates the amount of the chlorine source remaining in the storage vessel 120 from this distance. The ultrasonic sensor is positioned at the top of the storage vessel 120, typically in a cap or membrane 124 (FIG. 2) covering an opening to the storage vessel 120. The level sensor sends a 4-20 ma signal to the PLC to indicate the level of the liquid chlorine source in the storage vessel 120.

The pulse controller and flow indicator 260 reads the signals from the flow sensor 160 (input through the wire or transmission line 166) and transmits information regarding the water flow in the intake pipe 110 (or, alternatively, the flow of treated water in the pipe 115) and the predetermined or target pulse rate to the PLC in the control panel 250. The signals from the flow sensor 160 may comprise high-speed pulses, which are typically scaled by the pulse controller and flow indicator 260 for transmission to the PLC in the control panel 250. The flow sensor information may be scaled, and may be based on K and/or P factors. A "K factor" is a scalar number that is determined by the size (e.g., diameter) of the water intake pipe 110 and the material and/or construction of the water intake pipe 110. The maximum flow rate of water through the water intake pipe 110 may be determined by the capabilities and specifications of the corresponding pump drawing water from the water source (see FIG. 5). A "P factor" is a scalar number that is set by the user to determine how many gallons of water per pulse is to be received by the flow sensor. Examples of commercially available flow indicators suitable for use as the flow indicator 260 include Seametrics FT420 or FT430 flow meters. Examples of commercially available flow sensors suitable for use as the flow sensor 160 include Seametrics IP110 or IP210 flow sensors.

The power supply/control board 150 (FIG. 2) may include a master control board 152 and a slave control board 154 for the entire irrigation and/or fertigation system (not shown). The master and slave control boards 152 and 154 may control the flow rate, flow times, cleaning cycles, etc., of the entire irrigation system, as well as fertilizer addition to the fertigation system. Water-soluble fertilizers can be added through the irrigation system, so that a separate system for fertilizer addition is not necessary. The electrical panel 156 may function as an interface for electrical power supply to various components of the system 100, such as components on the controller board 140. An electrical power supply cord or line 158 (comprising, e.g., a conventional insulated copper electrical wire or cable) extends from the controller 140 and is conventionally plugged into an electrical outlet in the electrical panel 156.

The sensors 160, 162 and 164 may comprise certain switches that inform the programmable controller in the control panel 250 of certain parametric information and/or the status of certain components of the system 100. Flow sensor 160 may comprise an in-line roto-wheel meter, inserted into the water intake pipe 110 and configured to determine the flow rate of the water in the water intake pipe 110. Examples of commercially available flow sensors suitable for the flow sensor 160 include the Seametrics IP110 and IP210 flow sensors. The flow sensor 160 informs the PLC in the control panel 250 of the flow rate of the water in the water intake pipe 110 by sending a corresponding signal over the wire or cable 166.

Flow switch 162 may comprise a paddle switch inserted into the water intake pipe 110 that triggers (e.g., sends an active signal over the wire or cable 166 to the control panel 250 indicating that water is flowing in the water intake pipe 110) when the flow rate is greater than a predetermined threshold. The predetermined threshold for the flow switch 162 depends on the size of the irrigation system and the applicant/needs of the crop(s) in the field. For example, many large-scale irrigation systems (e.g., for fields having a growable area of ≥50 acres or ≥200,000 m$^2$) may have a threshold of ≥50 gallons/min or ≥200 liters/min for the flow switch 162. In some examples, the flow switch 162 has a threshold of ≥100 or 200 gallons/min (≥400 or 800 liters/min), depending on the size of the irrigation system and the water demand.

Pressure switch 164 is conventional. In one embodiment, it is adjustable, and can be set to a value greater than 14.7 psi (1.0 atm), for example 15 psi (1.02 atm). In this example, any time the pressure in the water intake pipe 110 is over 15 psi, the contacts in the pressure switch 164 close, and the pressure switch 164 sends a signal over the wire or cable 166 to the control panel 250 that the pressure in the water intake pipe 110 is acceptable for irrigating the field.

The filter 170 in FIG. 2 represents a single filter or a plurality or array of filters. When the system 100 includes an array of filters, the water intake pipe 110 may be split or divided using one or more T-joints or Y-joints into two or more filter feed pipes, each having a smaller diameter than that of the water intake pipe 110. The filter output pipes from the array may have the same or smaller diameter than the corresponding filter feed pipes, and they may be joined together using one or more T-joints or Y-joints to feed into the treated irrigation water supply pipe 115.

The filter(s) may each comprise a screen filter, a disc filter, a sand media filter, or a particle separator (the lattermost of which is, strictly speaking, not a filter). Screen filters are typically used when the water source is relatively clean (e.g., city water, certain wells), but may be disadvantageous when organics such as algae are present (e.g., ponds, canals, rivers, etc.). They usually comprise a plastic or stainless steel screen, and may be cleaned periodically, either manually or automatically (e.g., using a backflow process).

Disc filters typically comprise a plurality of plastic discs, stacked on top of one another in a filter housing. The discs contain grooves, the size and/or spacing of which correspond to the rating of the filter. The grooves become blocked over time with the contaminants in the water. Cleaning is typically performed manually, by loosening the disc cartridge and washing the discs individually.

Sand media filters comprise pressurized tanks containing sand, and are used primarily when the organic matter content of the water is high. The dimensions of the sand grains are chosen according to the size of the emitter orifice they are intended to protect.

Particle separators are devices that cause the water to be rotated in the body of the equipment. Centrifugal action forces heavier particles within the water to move to the outside of the stream and then fall to the base of the separator where they are collected and can be removed.

After the chlorine source is injected into the treated irrigation water supply pipe 115, the treated irrigation water is supplied to the field through a network of supply pipes (not shown), which typically include one or more branches (see, e.g., FIG. 1). The system 100 may comprise one or more additional pumps (not shown), configured to pump the treated irrigation water downstream through the network of pipes.

An Exemplary Method of Automatically and/or Continuously Treating Irrigation Water The present invention further relates to method of automatically and/or continuously treating irrigation water with a microbicidal disinfectant, such as a chlorine source. In the context of the present invention, the term "continuous" (and grammatical variations thereof) means as long as the irrigation system is providing irrigation water to the field.

Conceptually, an automated water treatment system may comprise a system of controls and monitors that regulate and automate precision feeding of water treatment chemicals. The system receives inputs from a variety of sensors, including (but not limited to) the flow sensor 160, the flow switch 162, the pressure switch 164, the level sensor in the cap or membrane 124, the pulse controller/flow indicator 260, and the chlorine flow monitor 220. From these inputs, the system can monitor the irrigation water pressure, the irrigation water flow rate, the level or amount of the chlorine source in the storage vessel 120, and status of the dosing pump 200 (on/off, primed/not-primed). Using these inputs, the system controller on the control panel 250 can determine when an irrigation system is on and begin dosing chlorine at an optimal and/or prescribed rate. Using inputs from the flow sensor 160, the system controller can proportionally match the flow rate and feed of the chlorine source at a constant dosage rate using the pump 200. Additionally, the system controller can determine when one or more inputs from the sensor(s), switch(es), indicator and monitor are out of range, and perform an adjustment to the system to correct the corresponding parameter and/or prevent harm or damage to the system or the crop(s) in the field. The adjustments may include, but are not limited to, proportionally controlling the chlorine dosage rate to the water intake flow rate, shutting down the irrigation system, notifying the user or monitor of a malfunction in the system, etc. The notification may trigger a response (e.g., a physical visit) from a local technician to look at the site and determine the cause of any malfunction.

A further aspect of the invention concerns a method of monitoring the automated and/or continuous water treatment system. For example, in some embodiments, the system controller on the control panel 250 sends information from sensor inputs and controls back to a remote terminal for monitoring. In some embodiments, the remote terminal comprises a server. During active irrigation (i.e., when the irrigation system 100 is providing treated irrigation water to the field), the system 100 may also send information for monitoring on a remote web portal. In some examples, the information for monitoring is compiled (e.g., at the remote terminal) to facilitate monitoring. To view the remote web portal, a user (e.g., a farmer, farm employee, technician, etc.) logs in and enters their credentials. For example, the user may log in on a user/customer login page on the remote web portal (see, e.g., FIG. 6A). Each user is assigned their own credentials, specific to a corresponding irrigation system 100. After successful login, the web portal may display a visual representation of the corresponding site and irrigation system.

The web portal also shows the status of various components in the system 100, such as the water intake pipe 110, the dosing pump 200, the pressure and flow switches 162 and 164, at least one of the flow sensor 160 and the pulse controller/flow indicator 260, the chlorine flow monitor 220, and the level sensor (not shown) on the cap/membrane 124. For example, the web portal may show whether the water intake pipe 110 is on or off (e.g., open or closed, has water actively passing through it or not, etc.), whether it has positive flow and pressure, and if so, the volume of such flow. The same information may also indicate the status of the water intake pump (which draws untreated water from the water source; see, e.g., FIG. 5), so the status of the water intake pump can be an alternative to the status of the water intake pipe 110. The web portal may also show whether the dosing pump 200 is on or off, whether the dosing pump 200 is primed or has lost prime, etc. The status information for the water intake pipe 110 and the dosing pump 200 displayed by the web portal may be current or live information.

Information from certain switches, sensors, alarms and controls in the system 100 may be displayed by or through the web portal. Such information is discussed below in order of operation of the switches, sensors, alarms and controls during start-up or initial operation of the system 100.

The pressure and flow switches 162 and 164 respectively indicate whether there is pressure and flow in the water intake pipe 110. If so (i.e., there is pressure and flow in the water intake pipe 110), the system 100 can begin to determine the irrigation water flow rate through the water intake pipe 110. Once calibrated, the flow sensor 160 and the pulse controller/flow indicator 260 indicate the volume per unit time (in gallons per minute [GPM], liters per minute, etc.), that untreated irrigation water is flowing through the water intake pipe 110. The chlorine flow monitor 220 notifies the system 100 (and the user through the web portal) whether the dosing pump 200 is on or off, and whether the pump 200 is primed or has lost prime. Finally, the level sensor on the cap/membrane 124 sends a value (e.g., representing the distance between the top of the storage vessel 120 and the uppermost surface of the chlorine source in the vessel 120) to the system controller on the control panel 250 to use in determining the amount of the chlorine source in the storage vessel 120.

Optionally, the web portal may also display one or more graphic charts. For example, one such chart may show the amount of the chlorine source used (e.g., delivered to treat the irrigation water in the system 100) over a fixed or adjustable date range. From this graph or chart, the user can view, determine or observe the historical consumption of chlorine source over time. Alternatively or additionally, the graph or chart may display the dosage rate of the chlorine source (e.g., in ppm) over a fixed or adjustable date range.

Other graphs or charts that the web portal may display include the historical status of the dosing pump 200 and the historical flow rate(s) of untreated irrigation water and/or the chlorine source. For example, the graph or chart of the status of the dosing pump 200 may show over a fixed or variable period of time (e.g., date range) whether the dosing pump 200 is primed or has lost prime. The flow rate graphs or charts may show the flow rate over a fixed period of time or an adjustable date range. Including both of the flow rate graphs or charts (i.e., of untreated irrigation water and of the chlorine source) enables proportional control. For example, the controller in the control panel 250 may control the flow rate (e.g., the pulses) of the dosing pump 200 to match the untreated irrigation water flow rate at a predetermined proportion (e.g., 3 ppm, 4 ppm, etc.) and feed the chlorine source at a constant proportional dosage rate (i.e., relative to the flow rate of untreated irrigation water).

In some embodiments, the amount of chlorine source fed into the untreated (and optionally filtered) irrigation water is that amount providing a predetermined minimum or threshold concentration of total chlorine at one or more outer field points (e.g., the farthest field point). Total chlorine is a measure of free chlorine and combined chlorine. Free chlorine in aqueous media is present as a pH-dependent equilibrium between hypochlorous acid (HOCl) and hypochlorite ion (OCl$^-$). The relative percentages of hypochlorous acid and hypochlorite ion vary with water pH. Hypochlorous acid predominates at low pH. Combined chlorine (i.e., chloramines) is chlorine, combined with ammonia or an organic nitrogen-containing molecule such as urea.

The web portal may also provide or display to the user one or more alarms. The alarm may notify the user and/or irrigator that one or more sensors, switches or controls has malfunctioned. The alarm may be visual (e.g., a red colored block displayed on the web portal screen), auditory (e.g., one or more beeps or other sounds), or haptic (e.g., a vibration from the user's cell phone).

An Exemplary Water Treatment Monitoring System

Figure 5:
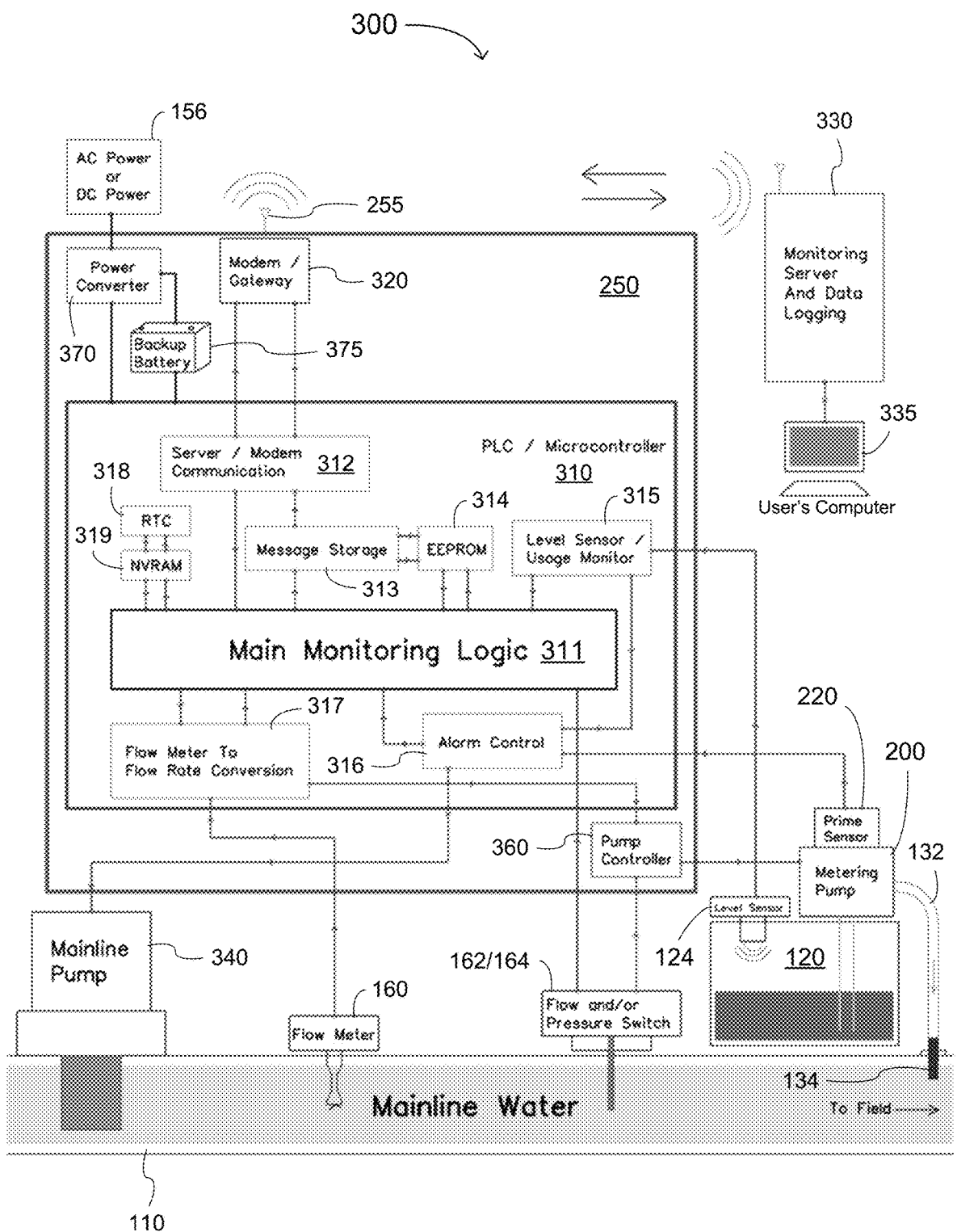
FIG. 5 is a block diagram of exemplary control logic suitable for use in embodiments of the present irrigation system.

In another aspect, the present invention concerns a controllable system for delivering a chlorine source into irrigation water, such as the exemplary system 300 in FIG. 5. The exemplary system 300 in FIG. 5 includes the control panel 250 (FIG. 4), the power supply 156 (FIG. 2), a server 330 in communication with a user computer 335, a pump 340 that pumps untreated irrigation water from the water source, the flow meter 160, the flow and/or pressure switch(es) 162 and/or 164, the dosing pump 200 (FIG. 3), the chlorine flow monitor 220, and the level sensor on the cap/membrane 124. The control panel 250 (FIG. 5) includes a programmable logic controller (PLC) or microcontroller 310 that includes logic for monitoring and/or controlling various operations, sensors, switches, etc. of the system 100, a modem or gateway 320, a pump controller 360 configured to control the flow rate of the dosing pump 200, a power converter 370, and a backup battery 375. Lines between each of these components (as well as the blocks in the PLC/microcontroller 310) are for electrical signals and/or communication of information, and the triangles/arrows along the lines indicate the direction of the electrical signal/information transfer. These components and their functions are discussed in greater detail below.

The present water treatment and monitoring system 300 allows field technicians and users (e.g., farmers/customers) to remotely view the status and history of a water treatment site (e.g., for irrigation of an agricultural field). In a relatively basic form, the water treatment system comprises a liquid chlorine source to treat (e.g., disinfect) the water and a feeding pump (e.g., dosing or metering pump 200) to inject the liquid chlorine source into the water. A flow meter (or pump controller 360) is used to control the feed of the liquid chlorine source at a rate proportional to the amount of irrigation water flowing to the field. Prior to the present invention, to meet a desired and/or predetermined treatment level (e.g., a minimum threshold concentration of total chlorine at an outer field point, such as the farthest field point), a field technician was required to visit the site to make adjustments to the equipment. In the present invention, an automated system monitors the flow of the irrigation water (from the water source) and the performance of the pump 200, stores this information/data, and sends it to the remote server 330, optionally along with alerts and alarms when any part of the system 300 is not working correctly or optimally.

A monitoring controller (e.g., a PLC or microcontroller 310) monitors the irrigation water flow rate, the dosing pump feed rate, and the level of the chlorine source in the storage tank. The controller 310 watches for a loss of flow from the dosing pump, and sends data to a central/remote monitoring server or data logger 330. Either the controller 310 or software on the server 330 analyzes the data to detect variances or errors between expected feed rates and measured feed rates. The server 330 may also display and/or provide a user interface for the users (e.g., personnel at an installation and/or monitoring company and/or their customers, such as farmers and farm employees) to view the current status and history of a water treatment site.

The programmable logic controller (PLC) or microcontroller 310 may include main monitoring logic 311, a server/communication block 312, a first memory 313 (e.g., a buffer memory) configured to store messages sent from the main monitoring logic 311 to the server 330, an electrically erasable and programmable (e.g., flash) memory 314 configured to store parameter values, target values and thresholds, instructions messages from the first memory 313, a level sensor and/or usage monitor 315 configured to determine the amount and/or feed rate of the chlorine source from the storage tank 120, an alarm control/logic block 316, a flow rate conversion block 317, a real time clock (RTC) 318, and a non-volatile random access memory (NVRAM) 319 configured to store certain information/data (e.g., information/data to and from the time-stamp information) even when no power is provided to the PLC or microcontroller 310. The PLC or microcontroller 310 may be implemented in one of the Micro800™ family of PLCs (e.g., the Micro850 PLC), available from Rockwell Automation (San Ramon, Calif.). It is within the abilities of one skilled in the art to design and use such a PLC/microcontroller. In further embodiments, the functionality of the PLC/microcontroller 310 can be integrated into an embedded control system.

The power supply 156 provides AC or DC power to the control panel 250. In one embodiment, the power supply 156 provides 24V DC power to the control panel 250. If necessary or desired, the power converter 370 converts AC power from the power supply 156 to DC power, or converts DC power from a first voltage from the power supply 156 (e.g., 12 V, 24 V, etc.) to one or more second voltages (e.g., 9 V, 5 V, etc.) for powering the PLC 310, the modem/gateway 320, the Flow Indicator, Sensors and Switches. In one example, the modem/gateway 320 comprises a Modbus-, HTTP- and/or TCP/IP-compliant modem or transceiver.

A master control mechanism is included in the hardware and/or is programmed into firmware of the PLC/microcontroller 310 to prevent feeding the chlorine source (e.g., turning off the dosing pump 200) when the pressure and/or flow switch(es) 162, 164 detect no water flow in the water intake pipe 110. The pressure and/or flow switch(es) 162, 164 can be as simple as a mechanical flow switch, a pressure switch, or both, located on the water intake pipe 110 to ensure that water is flowing before any chlorine source is delivered or injected into the irrigation water. The pressure and/or flow switch(es) 162, 164 provide feedback to the microcontroller and in effect control the power to the entire system 300, preventing any chlorine feeding from occurring when there is no water flowing in the intake pipe 110, for the safety of the irrigation water and/or the farmer's crops. In some embodiments, the information from the pressure and/or flow switch(es) 162, 164 may be communicated only to the microcontroller 310, and firmware (e.g., in the microcontroller 310) controls on/off signals and/or or power to the hardware (e.g., the dosing pump 200).

The flow meter 160 or other, similar sensor measures the amount of water flowing through the water intake pipe 110. In one example, the flow meter 160 transmits electrical pulses to the flow rate conversion block 317 to represent discrete volumes of water flowing through the pipe 110. The flow rate of the water flowing through the pipe 110 can be determined by measuring the frequency of the pulses. Other types of sensors can also be used in/for the flow meter 160, and the signals from the flow meter 160 may be transmitted using a method other than electrical pulses. The flow rate conversion block 317 mathematically converts the signals from the flow meter 160 to an irrigation water flow rate using site-specific constants (e.g., the K factor, the P factor, etc.). From the irrigation water flow rate and empirically-determined residual total chlorine at the outer and/or farthest field point(s), the PLC/microcontroller logic 311 calculates or generates an expected feed-rate of the chlorine source to be injected into the water. Alternatively, the expected feed-rate of the chlorine source can be calculated by the server 330 or by a standalone device. The calculated/expected chlorine source feed-rate is then transmitted to the pump controller 360.

The present system 300 includes a pump controller 360, configured to control the flow rate of the chlorine source introduced into the irrigation water by the metering or dosing pump 200. By using a metering or dosing pump, a known amount of the chlorine source is fed into the irrigation water for a given signal from the pump controller 360. In the present system 300, a single pump may be controlled by (i.e., receive signals from) the pump controller 360, but in many systems used in the field, two or more (e.g., 3, 4, or any other integer greater than 2) may be controlled simultaneously or contemporaneously by the pump controller 360. The pump controller 360 may transmit any of the following types of control signals to the dosing pump 200 to obtain a predetermined or desired chlorine source feed rate: a DC voltage pulse output (e.g., 3V, 5V, 12V, 24V, etc., for a length of time of 0.01-1 second); a constant-voltage signal gated by an open/closed contact switch using a conventional or solid-state relay; or an analog signal having a current of 4-20 mA and/or a voltage of 0-10V. In general, there is an empirical relationship between the parametric value of the control signal (e.g., the number of pulses per minute, the length of time that the contact switch is closed, the current, the voltage, etc.) and the amount of the chlorine source added to the irrigation water by the pump 200 per unit time (assuming the pump is primed and the chlorine source feed line 132 is filled). In one example, an analog signal having a variable voltage in the range of 0-10V is used as the control signal from the pump controller 360 to the metering or dosing pump 200. Thus, the PLC/microcontroller 310 knows the feed rate of the chlorine source from the parametric value(s) of the control signal to the pump 200.

Another important monitoring point is the level sensor on the cap/membrane 124 to determine the remaining quantity of the chlorine source in the storage tank 120. The amount of the chlorine source remaining in the storage tank 120 is used to predict when the chlorine source in the storage tank 120 should be or must be refilled, as well as to measure or calculate how much of the chlorine source has been fed into the irrigation water, optionally over a given or set period of time. The level sensor on the cap/membrane 124 may comprise one or more of the following types of sensors to measure the level in the tank 120 (e.g., the distance from the uppermost surface of the storage tank 120 to the uppermost surface of the chlorine source): ultrasonic (as described herein), microwave, radar, or sonar; a floating sensor, from which the distance from the uppermost surface of the storage tank 120 is measured; optical; capacitive; or conductivity- or resistance-based.

The level sensor on the cap/membrane 124 may transmit data or information to the level sensor calculator/usage monitor block 315 in the PLC/microcontroller 310 by substantially any signal type, including: an analog signal having a current of 4-20 mA and/or a voltage of 0-10V; Wi-Fi, Bluetooth, or other wireless communication; an Ethernet signal; a signal compliant with the USB, RS-485, RS-232, I2C, SPI, UART, or other serial bus or data transmission protocol. In one example, an analog signal having a variable current in the range of 4-20 mA is used as the signal from the level sensor on the cap/membrane 124 to the level sensor calculator/usage monitor block 315.

If the level of the chlorine source in the tank 120 is below a predetermined minimum volume (e.g., 3-10% of the volume of the tank 120, and any value or range of values therein, such as 5%), an alarm may be generated by the alarm control block 316. This ensures there is enough chlorine source in the tank 120 to treat the irrigation water (e.g., before a technician can visit the site and refill the storage tank 120). Precise measurements of the size and shape of the storage tank 120 can enhance the accuracy of the chlorine source volume calculation by the level sensor calculator/usage monitor block 315.

An accurate calculation of how much of the chlorine source has been fed into the irrigation water between two or more predetermined points in time can be determined by the level sensor calculator/usage monitor block 315 using the history of the readings from the level sensor on the cap/membrane 124, which may be stored in a memory (e.g., on the server 330). As a side note, if the measurement points are too close in time, noise in the measurement (a certain amount of which is normal or typically encountered) may cause fluctuations in the chlorine source feed rate calculation. For this reason, successive measurements of the volume of the chlorine source may be (and are usually) spread out over minutes or hours (e.g., 5 minutes-8 hours, or any value or range of values therein). Once the chlorine source feed rate is calculated or determined, it is compared to the target (e.g., intended) rate. If the difference between the calculated or determined feed rate and the target feed rate is greater than a predetermined threshold (e.g., 2-20% or any value or range of values therein), an alarm may be generated by the alarm control block 316.

Another important sensor is the pump flow sensor 220. The pump flow sensor 220 detects if the chlorine source is flowing through the pump 200 or chlorine source feed line 132 during operation of the irrigation system 300. Restricted flow or complete loss of flow of the chlorine source through the pump 200 can have many causes, and may have serious consequences if not addressed quickly. In the case where there is complete loss of flow, an alarm is immediately generated by the alarm control block 316. One or more attempts to regenerate flow in the pump 200 may be performed. The signal from the pump flow sensor 220 to the PLC/microcontroller 310 that the pump 200 has restricted or no flow can be as simple as an open or closed circuit, but could also be one of the other signal types or methods mentioned herein. In one example, the pump flow sensor 220 comprises a prime detector that detects loss of prime in the pump 200 and sends an active signal to the alarm control block 316 and the main monitoring logic 311 by closing and otherwise open circuit (e.g., using an automated or automatic switch).

The alarm control block 316 can automatically send various warnings and alarms to the server 330 (and, consequently, to field technicians and/or other users) in response to certain signals from the various sensors. This is particularly important when there may be a malfunction with the dosing pump 200 or other issue with the reliable supply of the chlorine source to the irrigation water. Some examples of such "self-monitoring" chlorine/dosing pump alarms can include: the pump sensor 220 showing flow of chlorine source from the pump 200, but the level of the chlorine source in the storage tank 120 has not changed (e.g., for a predetermined minimum length of time); the pump sensor 220 does not show flow of chlorine source from the pump 200, but the level of the chlorine source in the storage tank is changing; the pump sensor 220 does not show flow of the chlorine source when the pump 200 is enabled; and the level of the chlorine source in the storage tank 120 decreases, but either (1) no water is flowing or (2) the dosing pump 200 is not enabled, which may indicate a leak in the storage tank 120. A more sophisticated self-monitoring alarm may comprise comparing the calculated actual chlorine source usage over time against the expected or historical usage, and issuing an alarm or warning if the difference is greater than a predetermined threshold (e.g., 2-20% or any value or range of values therein), to check or verify the performance of the pump 200, feeding line 132, and injector 134. Depending on the severity of such issues, a warning may be first issued by alarm control block 316 (i.e., before an alarm) so that a technician or other user can verify the issue. In such cases, the warning may be issued when a first threshold is crossed, and the alarm may be issued when a second threshold (beyond the first threshold, in the same direction as the first threshold was crossed) is crossed. In some cases, the alarm may shut off the water intake pump 340.

Additional sensors can be present in the system 300 for performance verification and monitoring. Such sensors may test for one or more of the following characteristics or parameters of the irrigation water: oxidation-reduction (redox) potential; colormetrics; salinity; pH; dissolved oxygen; turbidity; and conductivity. A different sensor (e.g., in the field) can test for soil moisture. Data points and thresholds for warnings and alarms can be setup by one skilled in the art for any of these sensors (and in any number).

When a chlorine/dosing pump alarm is triggered, the PLC/microcontroller 310 may also automatically shut down or turn off the water intake pump 340 along with the feeding pump. This is done for the safety of the customer's water and/or crop. A special alarm message is also sent to the server, allowing employees to be dispatched to resolve the problem as quickly as possible.

The server 330 receives/retrieves and stores data from the PLC/microcontroller 310. In normal operation, the modem/gateway 320 sends live data periodically to the server 330. In one example, data is sent every five seconds from the PLC/microcontroller 310, through the modem/gateway 320, to the server 330. The data is logged to and stored in a database on the server 330. The current and historical values of the data can be used on the server and terminals such as the user computer 335 in communication with the server 330 to monitor parametric data and diagnose problems at one or more irrigation sites, and determine or identify one or more target dates for refilling of the storage tank(s) 120. Additionally, the server 330 stores and/or displays an interface (e.g., on the server and/or one or more user computers 335) for users to see current and historical data of any number of fields or water treatment sites that the user is authorized to see.

Data may be transmitted from the PLC/microcontroller 310 through the modem/gateway 320 to the server 330 as or by one or more of the following: cellular data or SMS messaging, Wi-Fi, Bluetooth, or other wireless communication protocol, Ethernet, and/or 2-way satellite data link. In one example, the data is transmitted by the modem/gateway 320 as cellular data.

Data communication between the PLC/microcontroller 310 and the server 330 using the modem and/or gateway 320, or alternatively, one or more additional modules such as a switch, data converter, etc., or through circuitry and/or one or more components built or integrated into the PLC/microcontroller 310. In one example, the modem/gateway 320 comprises a modem and a data converter connected to a gateway. Data communication bandwidth is primarily consumed by the server 330 accessing data from the PLC/microcontroller 310 remotely, but on-site and local data access from the PLC/microcontroller 310 may also be necessary in some instances. Accessing the PLC/microcontroller 310 remotely or locally can be done using Hypertext Transfer Protocol (HTTP) communications over the Internet using an interface defined by or created using hypertext markup language (HTML), an application programming interface (API), or a command-line interface. Protocols such as Modbus, BACnet, and others can be used to query the PLC/microcontroller 310 from or through the server and receive current parameter values and/or status information, allowing automated remote monitoring of the system 300 and logging of the data obtained therefrom.

Power may be supplied to the control panel 250 as either AC power or DC power, and at any of a wide variety of voltages (e.g., 6-24 V DC power, or 110-220V AC power). AC power may also be supplied at a frequency of 50 or 60 Hz. In most cases, the power converter/regulator 370 is needed to convert the power from the power supply 156 to a DC voltage for use by the components on the control panel 250. Certain components, such as motor control circuits (e.g., the pump controller 360, the alarm control block 316) may only be powered on when certain conditions are met, such as when the pressure and/or flow switches 162/164 are active. This ensures safety and saves power when the system is powered by the backup battery 375 or power source other than the power supply 156.

A battery 375 may be present and operatively connected to the power converter/regulator 370 to maintain the monitoring capabilities of the PLC/microcontroller 310 even when electrical power is not present or available at the irrigation site. This can be useful for monitoring for theft or leakage of the chlorine source, and can eliminate power-based delays in monitoring water flow and injection/addition of the chlorine source when pressure and/or flow in the water intake pipe 110 is detected.

The system 300 may also be configured to store messages (e.g., data and/or information to be sent from the PLC/microcontroller 310 to the server 330). When the modem/gateway 320 (or other communication device) is not connected, not powered, or otherwise not functioning, valuable information from the system 300 and/or the PLC/microcontroller 310 may be lost. To reduce or prevent this data loss from occurring, a non-volatile memory 319 may be present to store a certain quantity of data or information to be communicated to the server. For example, the non-volatile memory 319 may comprise a non-volatile random access memory (NVRAM), an EEPROM or flash memory, a SONOS memory, a ferroelectric RAM, etc. This data may be saved along in the non-volatile memory 319 with a time stamp (the time at which the data are generated or formatted for transmission to the server 330) from a real-time clock (RTC) 318, to be sent to the server 330 later. When a connection between the modem/gateway 320 and the server 330 is reestablished, the data/information stored in the non-volatile memory 319 can be sent to the server 330 for data logging and review.

An Exemplary Software-Based System for Automated Monitoring and Maintenance of a Water Treatment System A further aspect of the present disclosure relates to algorithms, computer program(s), computer-readable media and/or software, implementable and/or executable in a general-purpose computer or workstation equipped with a conventional digital signal processor or microprocessor, configured to perform one or more of the methods and/or one or more operations of the hardware disclosed herein. Thus, a further aspect of the invention relates to algorithms and/or software that create and/or implement part or all of any method disclosed herein. For example, the computer program or computer-readable medium generally contains a set of instructions which, when executed by an appropriate processing device (e.g., a signal processing device, such as a microcontroller, microprocessor or DSP device), is configured to perform the above-described method(s), operation(s), and/or algorithm(s).

The computer-readable medium may comprise any medium that can be read by a signal processing device configured to read the medium and execute code stored thereon or therein, such as a floppy disk, CD-ROM, magnetic tape or hard disk drive. Such code may comprise object code, source code and/or binary code. The code is generally digital, and is generally configured for processing by a conventional digital data processor (e.g., a microprocessor, microcontroller, or logic circuit such as a programmable gate array, programmable logic circuit/device or application-specific integrated circuit [ASIC]).

Thus, an aspect of the present invention relates to a non-transitory computer-readable medium, comprising a set of instructions encoded thereon and adapted to practice the method of monitoring and/or controlling treatment of water, including any of the details discussed with respect to FIGS. 6A-15D. In essence, the set of instructions encoded on the computer-readable medium may implement substantially any function of any hardware described herein, and may perform any part of any method described herein that is performed by the automated water treatment and/or monitoring system(s).

In some respects, water treatment automation comprises the synchronized use of (i) hardware for the physical management of a water chlorination system, such as the system 100 of FIG. 2 or the system 300 of FIG. 5, and (ii) software for the indirect control and review of the water chlorination system, preferably with minimal human interaction. Thus, water treatment automation may leverage both hardware-side and software-side resources to manage a greater volume of water to treat or a greater field area (e.g., as measured in acres or square kilometers). Benefits of water treatment automation include lower costs of water treatment, especially as a result of reducing or minimizing manpower time, money, and/or effort on both the service provider and the user or client using the irrigation equipment.

A critical piece of hardware in the water chlorination system is the programmable logic controller (PLC) 310, which may be equivalent to a computer with only the necessary components for a unique, specialized purpose. In the present invention, the PLC 310 controls the amount of the chlorine source to be applied or added to the irrigation water for crops, so that pathogens in the water may be killed or deactivated. The PLC 310 samples parametric data values and hardware component statuses from various sensors and switches, and the sampled data in the PLC 310 is processed and sent to server 330 via the modem/gateway 320 (which may be similar to a mobile gateway hotspot), where additional automation software is installed and operating. The automation software on the server 330, which may run continuously or substantially continuously, periodically logs and/or stores the data from the PLC 310 (e.g., at intervals of from 1 minute to 8 hours, or any length of time [such as 1 hour] or range of lengths of time therein) during the time that the PLC 310 is operating (e.g., receiving power), the irrigation system is operating (e.g., the intake pump 340 is receiving power, or at least one of the pressure switch and the flow switch 162 and 164 detect a positive flow or a pressure greater than ambient pressure in the water intake pipe 110).

In the present system 100/300, live or current information, system controls, and periodic reports may be readily accessible to monitoring personnel, field technicians, the user, and other authorized persons. The rate at which the chlorine source is fed into the irrigation water (e.g., by the dosing pump 200) is calculated by the PLC 310 and relayed back to the monitoring server 330. An end user may view the chlorine source feed rate and other data on a user terminal 335 via a web portal (not shown; for example, between the server 330 and the user terminal 335).

There are three primary users of the water treatment (e.g., chlorination) automation system: system technicians, who may control the system by connecting to the PLC 310 remotely (e.g., using a mobile phone, tablet computer or other device capable of [i] communicating with the server 330 and [ii] displaying the user interface for the water treatment system automation software); monitoring service providers (such as a logistics and/or data analytics team, group or department), who may monitor the data/information collected by the automation software system locally on the server 330; and a customer or authorized farm personnel, who can see live data on the tank levels, the rate at which the irrigation water is flowing (the "irrigation water flow rate"), and reports on past performance via a restricted access interface (e.g., web portal) configured for the customer or authorized personnel's use.

The benefits of accessing an automated irrigation water chlorination system remotely include the ability to manage a greater volume of irrigation water and/or a greater field area to treat and lower costs of such water treatment.

A user interface for the water treatment monitoring system may be available online, on an intranet, or on another internal network for internal use by personnel of the installation and/or monitoring service and/or the automated water treatment system provider, and visually displayed via a web portal for external users. In some embodiments, the web portal simply depicts the role of the PLC 310 in the automated system.

Figure 6A:
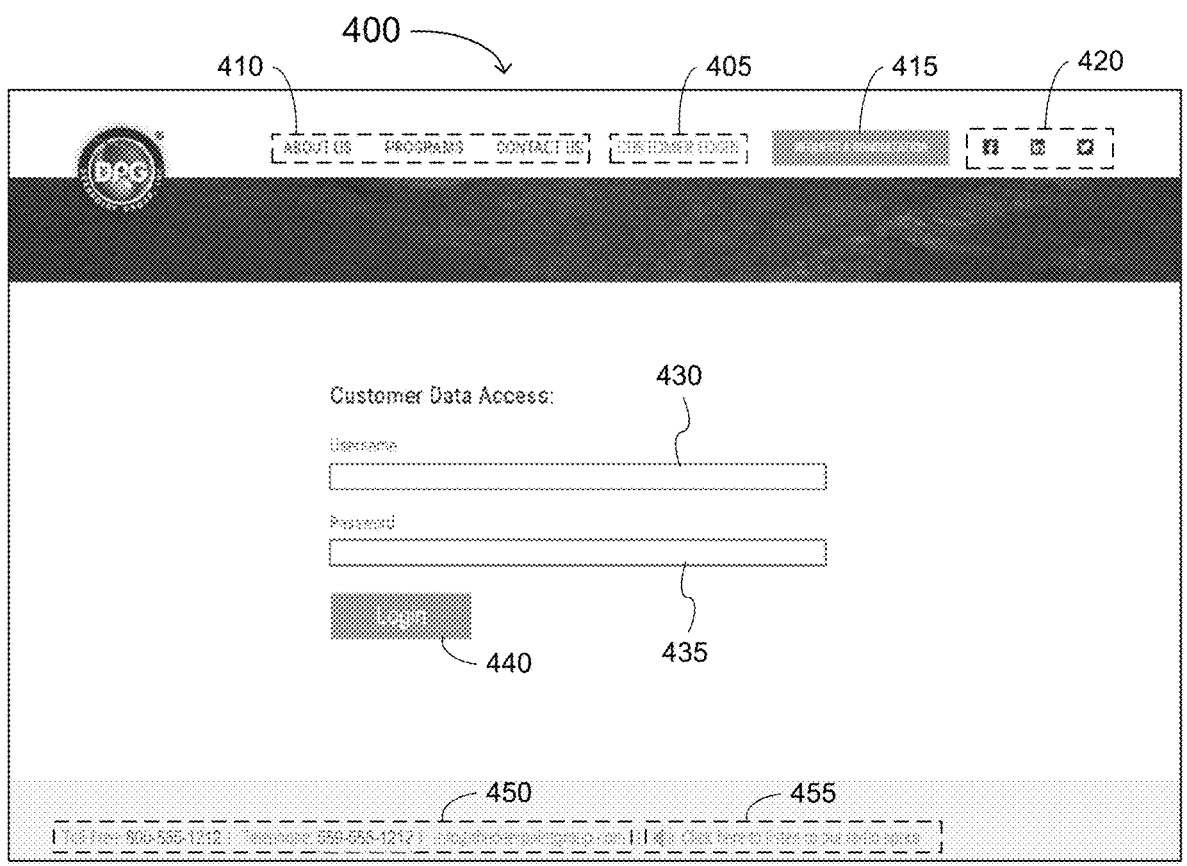
FIGS. 6A-B show exemplary user interfaces suitable for embodiments of the present automated and/or continuous water treatment and/or monitoring system.

FIG. 6A shows an exemplary user interface 400 the present automated and/or continuous water treatment and/or monitoring system. The user interface 400 is a login screen or page for the user to log in to the system. The user may navigate to the login screen 400 by clicking on or otherwise selecting a login button or icon 405, which may be on multiple pages of the system host's website. The user interface 400 also includes a section 410 including plurality of links to other pages, such as a page describing the system host company or organization, the services and/or products offered by the system host company or organization, and contact information for the system host company or organization, an icon or button 415 linking the user directly to a page on which a message may be sent directly to the system host, and/or a section 420 including one or more links to social media websites, such as Facebook, LinkedIn, and Twitter.

Figure 6B:
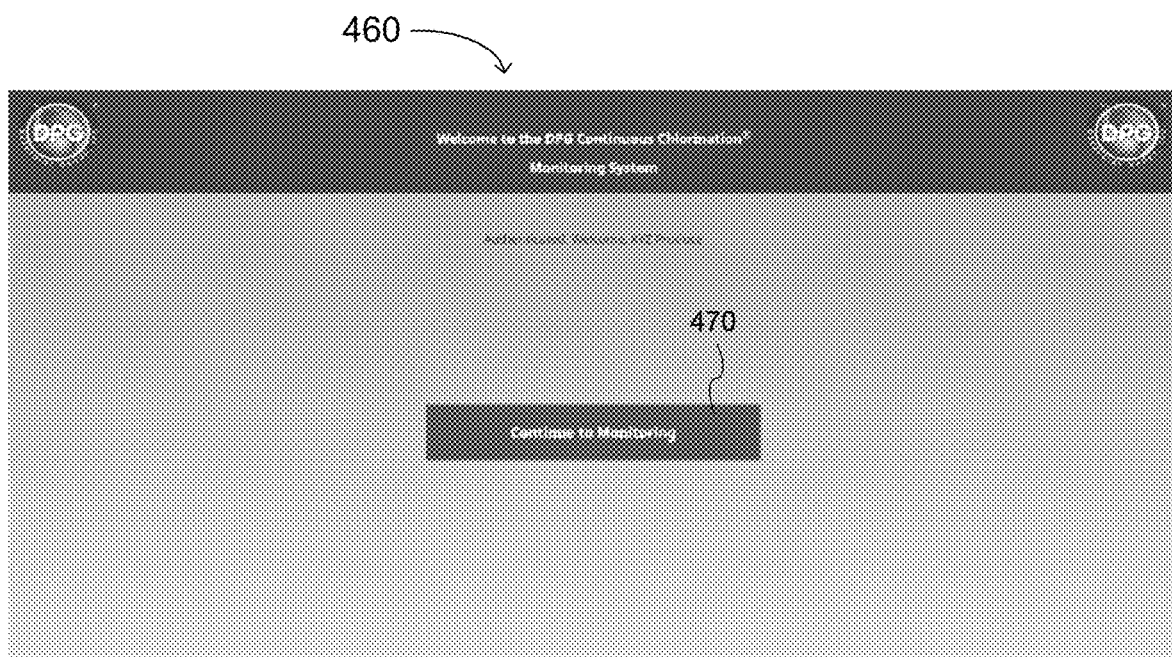

To access the automated water treatment system software (e.g., on the server 330, FIG. 5), the user may enter their username in the field 430 and their password in the field 435, then click on or otherwise select the login button or icon 440, which may take the user to a welcome page or screen 460, an example of which is shown in FIG. 6B. The user interface 400 may also contain a section 450 containing contact information of the system host, such as a phone number, an email address, a URL or website address, a street address, etc., and a section 455 containing a link to other information, such as advertising or promotional material.

Figure 7:
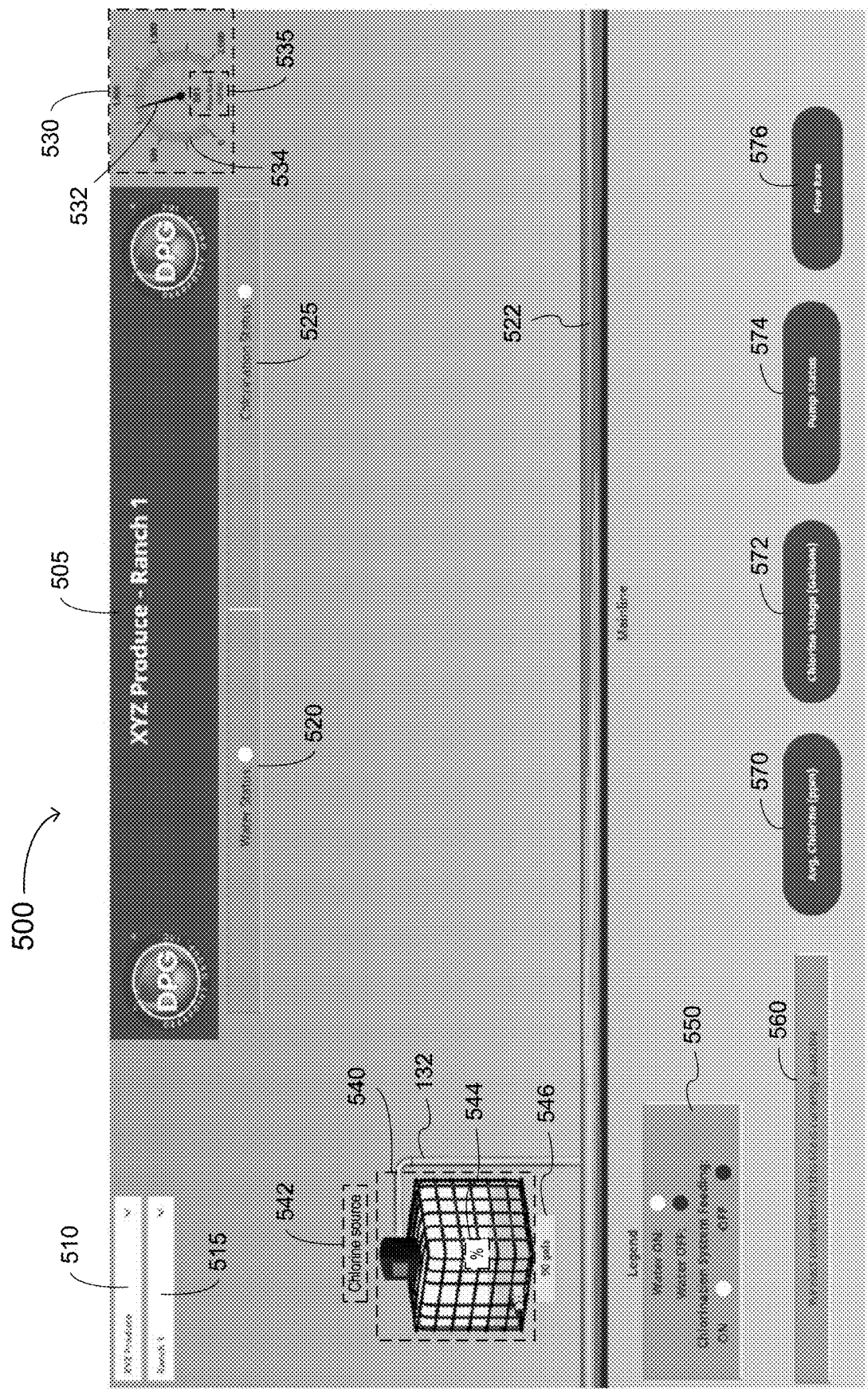
FIG. 7 shows an exemplary initial interface suitable for embodiments of the present water treatment system.

FIG. 6B shows an exemplary welcome page or screen 460, with an icon or button linking it to an initial interface for the monitoring software on the server 330. FIG. 7 shows an exemplary initial interface (e.g., a start page) 500 for the present automated water treatment system software. The initial interface 500 includes a first field 510 for selecting a customer or client (e.g., a farm or agribusiness; in this case, "XYZ Produce") and a second field 515 for selecting a site or field of that customer or client (in this case, "Ranch 1"). Below the customer/client and site/field identification block 505, one or more text fields may be included to identify the monitoring or analysis service provider, a particular monitoring or analysis service, the date and time, a confidentiality or copyright or other legal notice, etc.

The initial interface 500 displays a number of indicators for the status of certain equipment and the values of certain parameters in the irrigation system (e.g., system 100 in FIG. 2 or system 300 in FIG. 5). For example, separate indicators 520 and 525 for the on/off status of the water intake pump (e.g., pump 340, FIG. 5) and the chlorine source pump (e.g., pump 200, FIGS. 3 and 5) may be provided. As shown by the legend 550 in FIG. 7, the pump status boxes 520 and 525 "light up" (display a white circle) to indicate that the status of the corresponding pump is "on" when the controller (e.g., PLC 310 in FIG. 5) relays that the irrigation system is feeding water or the chlorine source, respectively. In contrast, a dark circle indicates that the status of the corresponding pump is "off" when the controller sends a signal indicating that the corresponding liquid (i.e., water or the chlorine source) is not flowing. The dark circle may appear in the same location as the white circle, or to the left of the text in the boxes 520 and 525. However, other symbols (e.g., a check mark vs. an "x", etc.) may also be acceptable, as are one set of symbols for the water intake pump status indicator 520 and a different set of symbols for the chlorine source pump status indicator 525.

A graphic indicator 522 (e.g., an image of the water intake pipe 110, FIGS. 2 and 5) may also be provided to indicate the flow of water through the water intake pipe when the controller relays that the irrigation system is feeding water. For example, when the graphic indicator 522 is blue, it indicates that water is flowing in the water intake pipe. Otherwise, the graphic indicator 522 displays a static blank pipe to indicate that water is not flowing in the water intake pipe. Alternatively, another indicator, such as an animation of moving water or one or more arrows moving along the pipe, may be used in the indicator 522. Typically, the water pump status indicator 520 and the graphic indicator 522 indicate that water is flowing through the water intake pipe in response to positive flow data from the corresponding flow indicator/switch and/or positive pressure data from the corresponding pressure switch, as transmitted by the controller and modem/gateway. Both the status indicator (e.g., 520 or 525) and the graphic indicator (e.g., 522) are not necessary, as long as at least one is shown on the page 500. For example, the page 500 does not include a graphic indicator to show the flow of the chlorine source in the corresponding feed tube 132, although such an indicator (e.g., a white color, an animation of the liquid chlorine source moving through the tube 132, one or more arrows moving along the tube 132, etc., similar to the graphic indicator 522) may be included.

The initial interface 500 may also include a graphic 530 and/or a text field 535 showing flow rate information for the water flowing in the intake pipe. The graphic 530 may comprise a gauge that displays the water flow rate as a needle 532 over an arc 534, labeled from 0 to a value greater than the maximum rate that the water pump can supply (e.g., 0-2000 GPM, 0-8000 liters/minute, etc.). The text field 535 shows the same flow rate information in numerical/text form.

The initial interface 500 includes a graphic image 540 of the storage vessel (e.g., storage vessel 120, FIGS. 2 and 5), displaying the amount of the chlorine source therein. In irrigation systems containing more than one storage vessel, a different image is displayed for each storage vessel in the irrigation system. The image 540 shows no content if the corresponding level sensor in the irrigation system reads an empty vessel; otherwise, the level of the chlorine source in the vessel visually rises or falls in the image 540 in a manner proportional to the level reading relayed from the level sensor. The graphic image 540 may be accompanied by a field 542 displaying the identity of the chlorine source (e.g., $Ca[OCl]_2$, KOCl, etc., or a corresponding tradename for the chlorine source), a percentage value of the chlorine source remaining in the storage vessel (e.g., as a percentage of the total volume of the vessel), and/or a text field 546 indicating the volume of the chlorine source remaining in the storage vessel (e.g., in liters, gallons, etc.). In addition, the initial interface 500 may include a text field 560 to indicate whether the wireless connection to the controller is available/operational or not.

Figure 8:
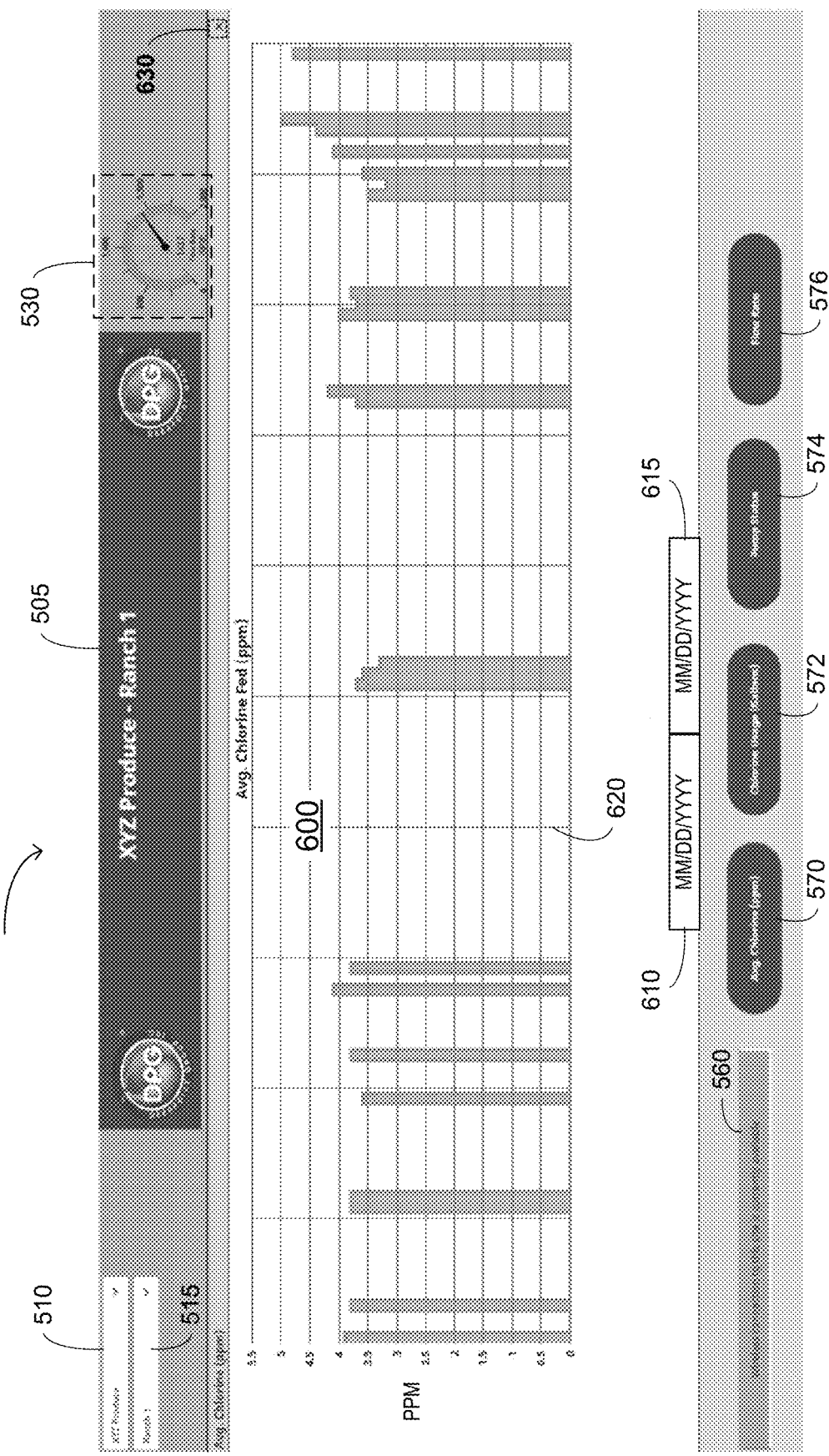
FIG. 8 is an exemplary graph showing the average chlorine feed rate per unit time in an example of the present water treatment and/or monitoring system.

The initial interface 500 also includes a plurality of buttons or icons 570-576, linking to other pages in the software system on which certain data may be displayed and/or analyzed. For example, a first button or icon 570 may change the display to a graph 600 of the average chlorine feed rate per unit time, as shown in FIG. 8. Alternatively, the button or icon 570 may navigate to a separate page displaying the graph 600.

The average chlorine feed rate in the graph 600 in FIG. 8 is the amount of the chlorine source added to the treated water intake pipe 115 by the dosing pump 200 relative to the amount of water pumped into the water intake pipe 110 (FIG. 5), averaged over a unit of time. As shown in FIG. 8, the average chlorine flow rate is measured in parts per million (ppm), and is displayed as a bar graph, but the invention is not limited to such a display or depiction. For example, the average chlorine feed rate data may be displayed as a line graph or a table, and/or the data in the graph 600 may depict raw or real-time average chlorine feed rate values (or the corresponding parametric data from which the average chlorine feed rate values are calculated) as reported by the PLC 310 and the modem/gateway 320. The average chlorine feed rate may be calculated by the PLC 310 or by the server 330 from the flow rates of the water in the intake pipe 110 and of the chlorine source through the dosing pump 200. The determinations and/or calculations of the flow rates of the water in the intake pipe 110 and of the chlorine source through the dosing pump 200 are explained later, with respect to the diagnostic interface 1000 (FIGS. 15A-D).

FIG. 9 shows a chart 650 of actual (raw or live) average chlorine feed rate values from the PLC 310 and modem/gateway 320 or, alternatively, as calculated by the server from the water and chlorine source flow rates from the PLC 310 and modem/gateway 320. The data feed from the PLC 310 and modem/gateway 320 may be periodic and/or on demand. For example, the values in the chart 650 are reported once per hour, but a different frequency (e.g., x times per hour, where x is a positive integer of 2 or more, and preferably, a positive integer in which 60 can be divided to give another positive integer) can also be used.

Referring back to FIG. 8, the average chlorine feed rate for the graph 600 may be an average per hour, per quarter-hour, per minute, or other unit of time. The two points in time for the graph 600 may be defined using the starting date text field 610 and the ending date text field 615. Each vertical line 620 may represent an independent unit of time (e.g., a 6- or 12-hour period, a day, a week, a month, etc.).

The sections or regions of the graph 600 that indicate that the no chlorine source is being fed to the treated water intake pipe 115 represent periods of time during which the dosing pump 200 is off or not operational, and thus, during which the water intake pump 340 is scheduled to be off. When the water intake pump 340 is scheduled to be on or operational (e.g., as part of an irrigation schedule for supplying water to the field), but no chlorine source is being fed to the treated water intake pipe 115, an alarm may be sent to one or more users, as described herein.

Figure 10:
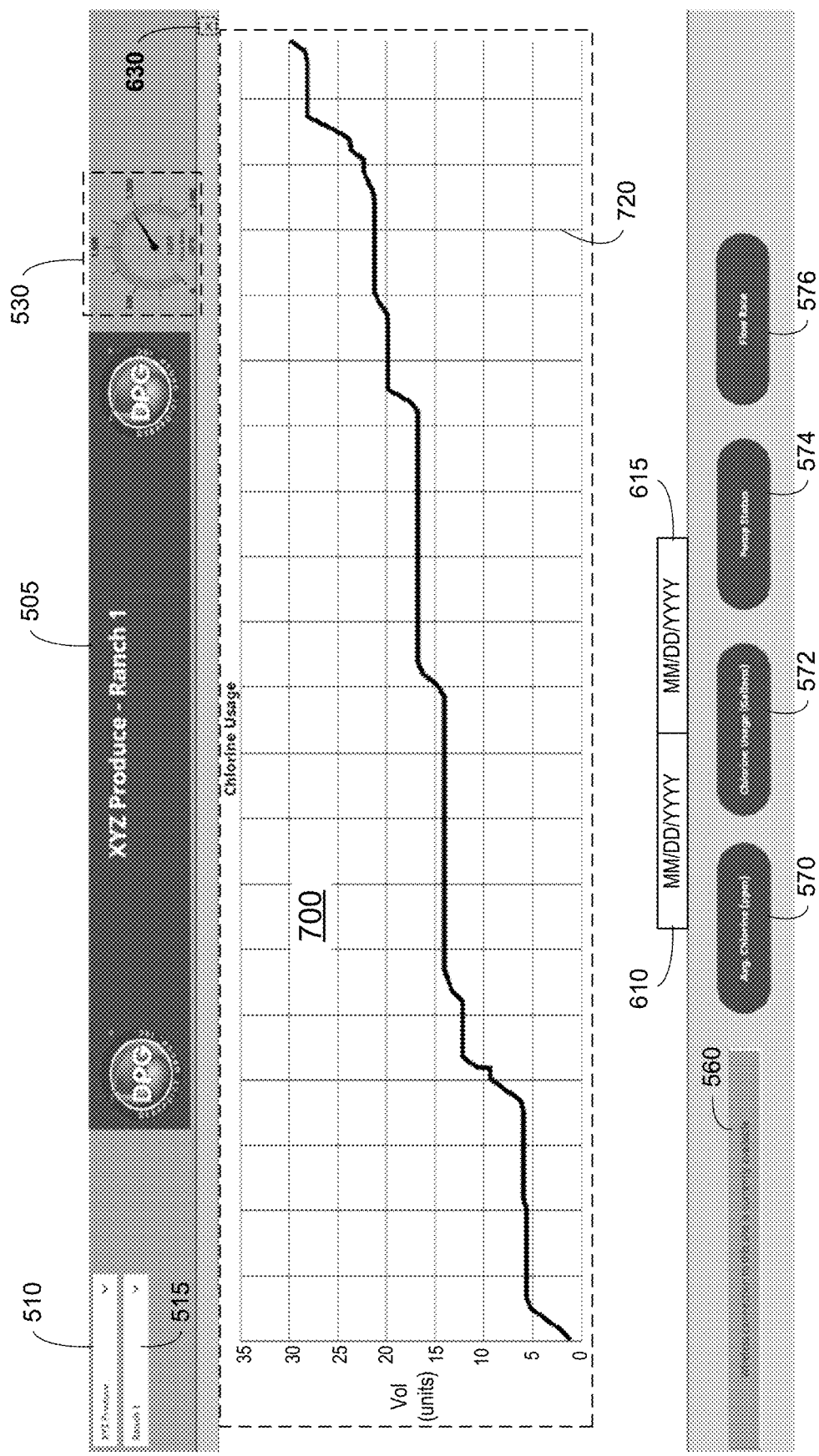
FIG. 10 is an exemplary graph of the total volume of the chlorine source consumed by the exemplary irrigation system between two points in time, in accordance with an embodiment of the present water treatment and/or monitoring system.

A second button or icon 572 may change the display to a graph 700 of the total volume of the chlorine source consumed (and presumably added to the irrigation system) between two points in time, as shown in FIG. 10. Alternatively, the button or icon 572 may navigate to a separate page displaying the graph 700. The unit of volume in the graph 700 may be liters, gallons, etc. The two points in time may be defined using a starting date text field 710 and an ending date text field 715. The date format is not critical. If desired, additional text fields may be added to include the starting time and the ending time (in hours and minutes; e.g., HH:MM). Optionally, if AM/PM information is not included in the starting and ending time fields, a pull-down menu may be added to provide the choice. Each vertical line 720 may represent a unit of time (e.g., a 6- or 12-hour period, a day, a week, a month, etc. The flat sections or regions of the graph 700 (i.e., where the slope=0) represent periods of time during which no chlorine source was added to the irrigation system. As with the graph 600, the graph 700 includes the exit button or icon 530 to return to the initial interface 500 (FIG. 7). A data feed from the level sensor on the cap/membrane 124, PLC 310 and modem/gateway 320 (FIG. 5) similar to the data feed 580 of FIG. 8, but for the volume of the chlorine source consumed, may be used to generate the graph 700.

Figure 11:
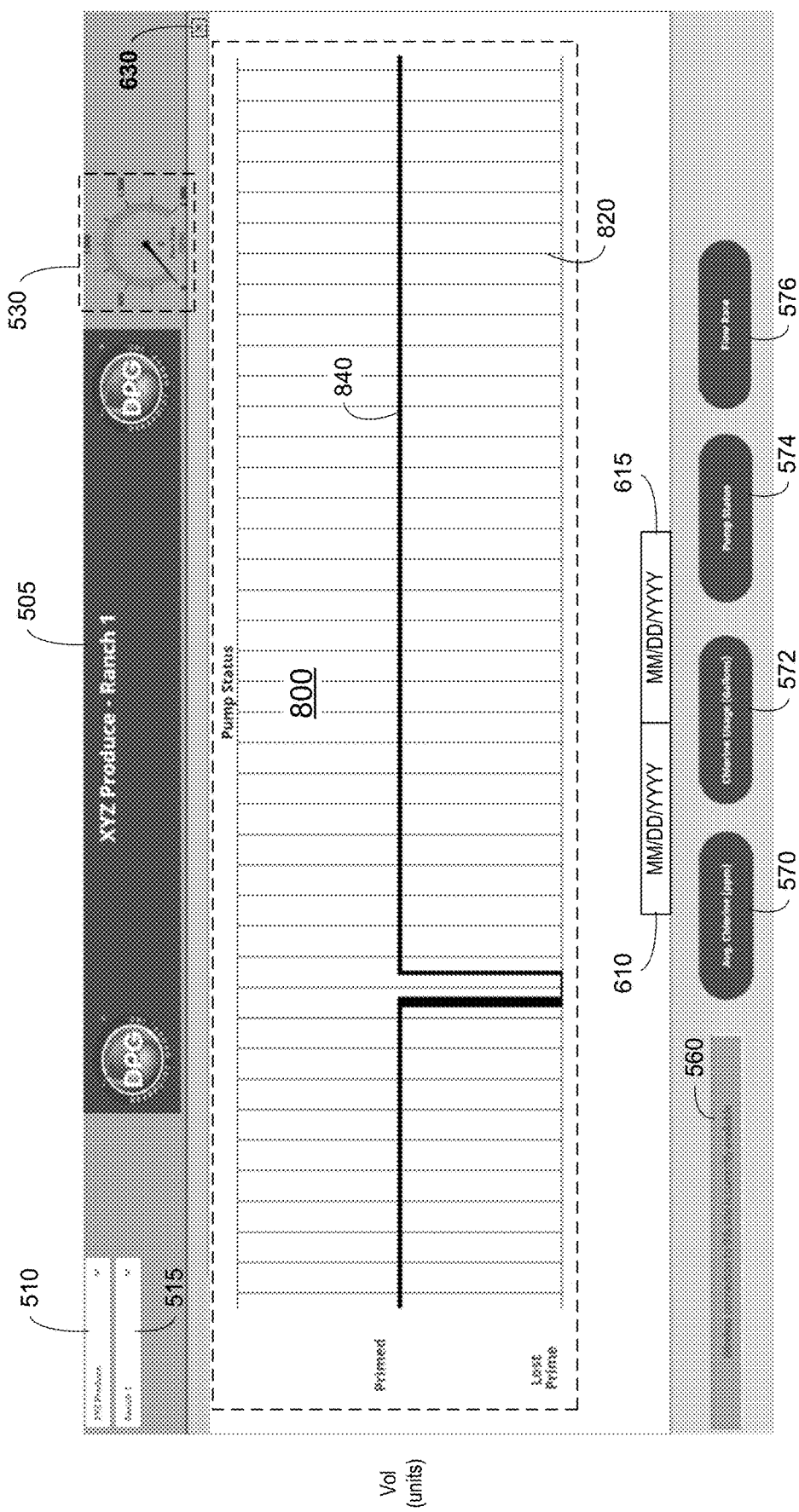
FIG. 11 is an exemplary graph of the status of the chlorine pump between two points in time, in accordance with an embodiment of the present water treatment and/or monitoring system.

A third button or icon 574 may change the display to a graph 800 of the status of the dosing (e.g., chlorine source) pump between two points in time, as shown in FIG. 11. Alternatively, the button or icon 574 may navigate to a separate page displaying the graph 800. The status of the dosing pump is either "primed" or "lost prime," as determined by the chlorine flow monitor 220 (FIG. 3), although other statuses may be monitored. For example, the dosing pump status may be "on" or "off," or "pumping" or "not pumping," and may be detected by a flow switch or flow meter in the chlorine source feed line 132 similar to (but more resistant to hypochlorite ions and molecular chlorine than) the flow switch 162 or the flow meter 160, although the invention is not limited to these examples.

Also, as shown in FIG. 11, the "primed" status is indicated by a relatively high value on the graph 800, and the "lost prime" status is indicated by a relatively low value on the graph 800, but the invention is not limited to these depictions. For example, the two status values can be reversed (e.g., the "primed" status may be indicated by a relatively low value, and the "lost prime" status may be indicated by a relatively high value), or the status values can be represented by a bar graph, similar to FIGS. 8 and 10. Alternatively, one value of the pump prime status may be depicted using a first color (e.g., the "primed" status may be indicated by a green color), and the other value may be depicted using a second, different color (e.g., the "lost prime" status may be indicated by a red color), etc.

As for graphs 600 and 700 in FIGS. 8 and 10, the two points in time may be defined using the starting date text field 610 and the ending date text field 615. Each vertical line 820 may represent a unit of time (e.g., a 6- or 12-hour period, a day, a week, a month, etc. As with the graphs 600 and 700, the graph 800 includes an exit button or icon 630 to return to the initial interface 500 (FIG. 7). A data feed from the chlorine flow monitor 220, PLC 310 and modem/gateway 320 (FIG. 5) similar to the data feed 580 of FIG. 8, but for the dosing pump status, may be used to generate the graph 800.

The sections or regions of the graph 800 that indicate that the dosing pump lost its prime (i.e., where the value of the line 840 is 0) represent periods of time during which no chlorine source was added to the irrigation system. Typically, this results in an alarm being sent to one or more users, such as one or more personnel of the monitoring service provider, a responsible field technician, the farm owner or operator, one or more personnel on the farm, etc. Alternatively, the alarm can be broadcast (e.g., using an email alias) to a plurality of users, and/or the irrigation pump.

FIG. 12A shows an exemplary alarm message 850 that is automatically sent by the automated water treatment system monitoring software when at least two conditions are met: (1) a dosing pump 200 loses its prime or is otherwise not supplying the chlorine source to the chlorine source feed line 132 (e.g., FIG. 3); and (2) the water intake pump 340 is operational and pumping water from the water source into the intake pipe 110 (e.g., FIG. 5). The exemplary alarm message 850 is an email, but other types of alarms may be sent in addition or as an alternative to the email 850. For example, a text or SMS message may be sent to a user's mobile phone; a flashing visual signal may be sent to the user's computer or the users' computers 335; an auditory alarm may be sent to the user's mobile phone or transmitted by a speaker operably connected to a sound signal-producing block in the PLC 310; and/or a message or signal may be sent to the user's mobile phone that causes a haptic (e.g., vibrating) alarm in the mobile phone, etc.

The alarm message 850 includes a sender email address 860, a subject field 865-A, and a message section 870. The sender email address 860 typically includes some form of the word "alarm" or its equivalent. In the case of a warning, the equivalent warning message (not shown) includes some form of the word "warning" or its equivalent in the sender email address 860. The domain name in the sender email address 860 is typically that of the monitoring service provider. The subject field 865-A identifies the site (e.g., farm, agribusiness, etc., and field [ranch], section, sector, etc. thereof), along with the specific alarm of warning. In the case of the alarm message 850, the specific alarm is that the dosing pump 200 has lost prime. The message section 870 may contain substantially any message notifying the user(s) of the alarm or warning. In the case of the alarm message 850, the message section 870 identifies the service being monitored ("DPG Continuous Chlorination© Program"), the specific alarm, and the site.

In general, as current or real-time ("live") data or information is sent by the PLC 310 and modem/gateway 320, and is received, collected and/or processed by the software system on the server 330, any data from any sensor (e.g., switch, meter, monitor, etc.) that excurses a threshold (i.e., passes beyond a set limit) or is otherwise out of the ordinary can trigger an alarm that sends an email or other message as described in the previous paragraph automatically to internal contacts at the monitoring service provider and/or to external user contacts. Examples of other specific alarms that can be automatically sent by the automated water treatment system monitoring software include the water treatment system (e.g., 100 in FIG. 2 or 300 in FIG. 5) becoming disconnected from the server 330, the level or volume of the chlorine source in the storage vessel 120 decreasing below a predetermined minimum threshold (e.g., requiring a refill of the chlorine source in the storage vessel 120), the water in the intake pipe not flowing at a time when it should be flowing, the residual chlorine level at an outer field point or the farthest field point decreasing below a predetermined minimum threshold (e.g., 1 ppm, 0.5 ppm, 0.4 ppm, or any other value below 1 ppm), etc.

For example, FIG. 12B shows an exemplary alarm email 880 that is automatically sent by the automated water treatment system monitoring software when the server 330 loses its connection to the modem/gateway 320 in the water treatment system (FIG. 5). Similar to the alarm message 850 of FIG. 12A, the alarm message 880 includes the sender email address 860, a subject field 865-B, and a message section 890. In this case, the subject field 865-B and the message section 890 change to match the specific alarm being sent.

FIG. 13 shows another graph 900 of the water intake flow rate over between two points in time. The graph 900 may appear in an interface similar or identical to those shown in FIGS. 8, 10 and 11. Alternatively, the button or icon 576 may navigate to a separate page displaying the graph 900. The flow rate is for the water intake pump 340 (FIG. 5), although other pumps may also be monitored. As shown in FIG. 13, the water intake flow rate is measured in unit volume per unit time, and displayed as a bar graph depicting the average water intake flow rate for a given time period, but the invention is not limited to such a display or depiction. For example, the flow rate data may be displayed as a line graph or a table, and/or the data may depict the raw flow rate values. FIG. 14 shows a chart 950 of actual (raw or live) water intake flow rate values from the flow meter 160 (FIGS. 2 and 5) as fed or reported by the PLC 310 and modem/gateway 320. The data feed from the flow meter 160, PLC 310 and modem/gateway 320 may be periodic and/or on demand. For example, the values in the chart 950 are reported once per hour, but a different frequency (e.g., x times per hour, where x is a positive integer of 2 or more, and preferably, a positive integer in which 60 can be divided to give another positive integer) can also be used.

Referring back to FIG. 13, the unit volume per unit time for the flow rate graph 900 may be in gallons per minute, liters per minute, gallons per hour, liters per hour, or other convenient unit of measure. As for graphs 600, 700 and 800 in FIGS. 8, 10 and 11, the two points in time for the graph 900 may be defined using the starting date text field 610 and the ending date text field 615. Each vertical line 920 may represent a unit of time (e.g., a 6- or 12-hour period, a day, a week, a month, etc.).

The sections or regions of the graph 900 that indicate that no water is flowing in the water intake pipe 110 represent periods of time during which where the water intake pump 340 is off or not operational. When the water intake pump 340 is scheduled to be on or operational (e.g., as part of an irrigation schedule for supplying water to the field), but no water is flowing in the water intake pipe 110, an alarm may be sent to one or more users, as described herein.

Additional links may be present on the initial interface 500 (FIG. 7, and optionally, also FIGS. 8, 10, 11 and 13) to view trends over time of other data from the system 100 or 300, such as the residual total chlorine level at one or more outer field points (e.g., the farthest field point), water flow rates at other points in the irrigation pipe network, etc. Furthermore, each of the graphs 600, 700, 800 and 900 may be displayed without one or more of the features of the initial interface shown in FIGS. 8, 10, 11 and 13.

Referring back to the login screen 400 (FIG. 6A), certain users who are also personnel responsible for monitoring the water treatment system and who have authorization to make modifications to parameters in the water treatment system also have access to a diagnostic interface that displays certain parametric data and allows authorized users to modify certain parametric values in the water treatment system. FIGS. 15A-D show an exemplary diagnostic interface 1000A-D, configured to provide diagnostic data regarding the automated and/or continuous water treatment system (e.g., 100 of FIG. 2 or 300 of FIG. 5) and change or modify certain settings or parameters of the water treatment system. For example, the exemplary diagnostic interface 1000A includes a pulldown menu 1010 containing a list of user (e.g., customer or client) names, a pulldown menu 1015 containing a list of fields or sites (e.g., ranches) of that user to be monitored and/or controlled, a button or icon 1020 for updating the firmware in the water treatment system, a slidable selection button 1030 to select between a basic (e.g., relatively simple) display and an advanced (e.g., relatively detailed) display, a slidable selection button 1035 to enable editing of certain parametric values in the water treatment system, and a diagnostic data display 1040.

Figure 15A:
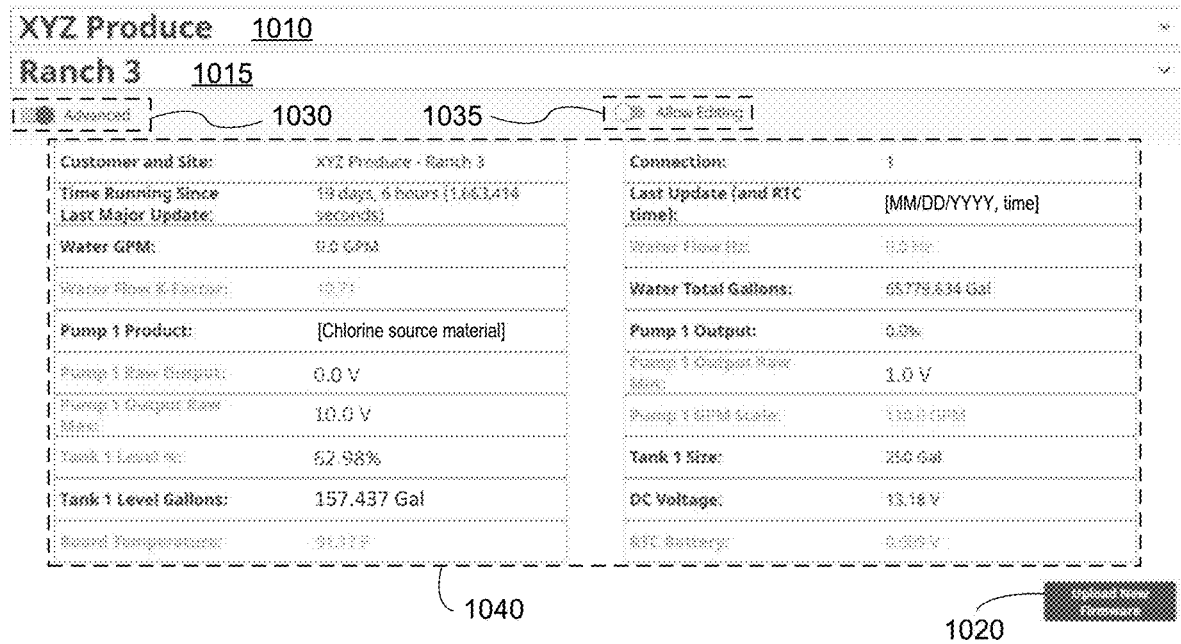
FIGS. 15A-D are exemplary diagnostic data displays, in accordance with an embodiment of the present water treatment and/or monitoring system

The diagnostic data display 1040 as shown in FIG. 15A is an exemplary advanced display, including the customer and site names, the status of the connection between the server 330 and the modem/gateway 320, the time elapsed since the most recent software and/or firmware update, the date and time of the most recent communication from the PLC 310 and the modem/gateway 320 (including the time from the RTC 318; e.g., the "Last Update"), the water intake flow rate, the reading from the water flow sensor/meter 160 (in Hz), the K factor for the water intake pipe 110, the total amount of water pumped by the water intake pump 340, the chemical name or trade name of the chlorine source in each storage vessel 120 at the site, a setting in the hardware and/or circuitry of the pump 130 (e.g., "Pump 1 Raw Output") from which the output of each dosing pump 200 at the site can be determined, the output of each dosing pump 200 as a percentage of the maximum output, the minimum and maximum settings for the parameter in the hardware and/or circuitry of the pump 130 that controls the flow rate of each dosing pump 200 at the site, the scale of the current flow parameter setting for each dosing pump 200 (i.e., the water intake flow rate equal to the current water intake flow rate times the maximum flow rate of the dosing pump 200 divided by the current flow rate of the dosing pump 200), the amount of the chlorine source in each storage vessel 120 as a percentage of the total volume of the storage vessel 120 and in an absolute volume (e.g., in units of gallons, liters, kg, etc.), the size or volume of each storage vessel 120 at the site, the DC voltage being supplied to the control panel 250 and/or the PLC 310, the temperature of the control panel 250 or the board on which the PLC 310 is mounted, and the voltage of the battery powering the real-time clock 318. Other data and/or information that can be displayed in the advanced diagnostic data display 1040 includes the pressure of the water in the water intake pipe 110, the charge (e.g., as a percentage) on any backup battery that may be present, residual total chlorine level at one or more outer field points (e.g., the farthest field point), etc.

The basic (i.e., relatively simple, or non-advanced) diagnostic data display 1040 displayed when the "Advanced" selection button 1030 is turned off or deselected may include the water intake flow rate, the chemical name or trade name of the chlorine source in each storage vessel 120, the flow rate of the chlorine source pumped by each dosing pump 200, the amount of the chlorine source in each storage vessel 120 as at least one of the percentage of the total volume of the storage vessel 120 and the absolute volume, the status of the connection between the server 330 and the modem/gateway 320, the total amount of water pumped by the water intake pump 340, and the size or volume of each storage vessel 120 at the site. Optionally, the non-advanced diagnostic data display 1040 may further include the customer and site names, the time elapsed since the most recent firmware update, the date and time of the most recent firmware update, the output of each dosing pump 200 as a percentage of the maximum output, and/or the DC voltage supplied to the control panel 250.

The site for which the diagnostic data is shown in display 1040 includes only one storage vessel and one dosing pump. In the example of FIG. 15A-D, an operational connection between the server 330 and the modem/gateway 320 is indicated with a "1"; if there is no connection, the connection status is "0." The water intake flow rate is calculated from the reading from the water flow sensor/meter 160 and the K factor, the product of which is a flow rate (in this case, in gallons per minute). The amount or flow rate of the chlorine source pumped by each dosing pump 200 can be determined from the pump output data and the maximum flow rate. Dividing the dosing pump raw output value by the maximum dosing pump raw output value gives the dosing pump output as a percentage of the maximum output. The dosing pump output can then be multiplied by the known (predetermined) maximum flow rate of the dosing pump 200 to determine or estimate the flow rate of the dosing pump 200.

The interface shown in FIGS. 15A-D is for a dosing pump for which the hardware/circuitry parametric setting ("Pump 1 Raw Output") determines the pulse rate of the dosing pump. In the example shown in FIGS. 15A-D, the parametric setting is a control voltage received by the pump 200. For example, in FIG. 15A, the control voltage to the pump 200 is 0.0 V, so the pump 200 is off, and no irrigation water is being provided by the irrigation system. In another example, the parametric setting is for a digital-to-analog converter in the pump controller 360 (FIG. 5) that determines the rate at which the dosing pump 200 delivers strokes or pulses of the chlorine source. In alternative embodiments, the dosing pump 200 is controlled by the number (and optionally the length) of pulses per unit time during which the pump 200 delivers the chlorine source to the chlorine source feed line 132. In such alternative embodiments, the diagnostic interface 1000-A through 1000-D may display the pulse rate (in Hz) to be applied by the pump controller 360 to the dosing pump 200. Minimum and maximum pulse rates may also be displayed, rather than the minimum and maximum control voltages to the pump 200, as shown in FIGS. 15A-D.

The control voltage to the pump 200 is determined by the irrigation water flow rate, the K factor, and the minimum and maximum control voltages (when the pump 200 is in use). The pump 200 control voltage is the pump output times the difference between the maximum control voltage and the minimum control voltage, plus the minimum control voltage. The pump output is the irrigation water flow rate (in gal/min or liters/min, as measured by the flow sensor 160) divided by a "volume per minute" scale factor, which is set by a user (e.g., a monitoring service technician or a farm employee) based on the site's targets (e.g., for water flow rate, residual chlorine concentration at the farthest field point[s], etc.). In the example systems 100 and 300 of FIGS.

2 and 5, the irrigation water flow rate is the water flow signal value from the flow sensor 160 (in Hz; see "Water Flow Hz" in the right-hand side of the table 1040 in FIGS. 15A-D) divided by the K factor, times 60. The minimum and maximum control voltages are constants based on the hardware in the system (e.g., the pump 200 and components in the control panel 250). When the output of the pump 200 is >0, the control voltage is between the minimum and maximum control voltages. However, if the output of the pump 200 is 0, the control voltage is 0.

In embodiments in which the dosing pump 200 is controlled by the number of pulses per unit time, the flow rate of the chlorine source from the dosing pump 200 may be determined by the pulse rate times the P factor. The "P factor" is the water intake flow rate for which the dosing pump delivers one pulse of the chlorine source. For example, if the P factor is 10, then the pump controller 360 is configured to set the pulse rate for the dosing pump 200 to one pulse per 10 units volume per unit time (e.g., GPM) of the water intake flow rate.

Figure 15B:
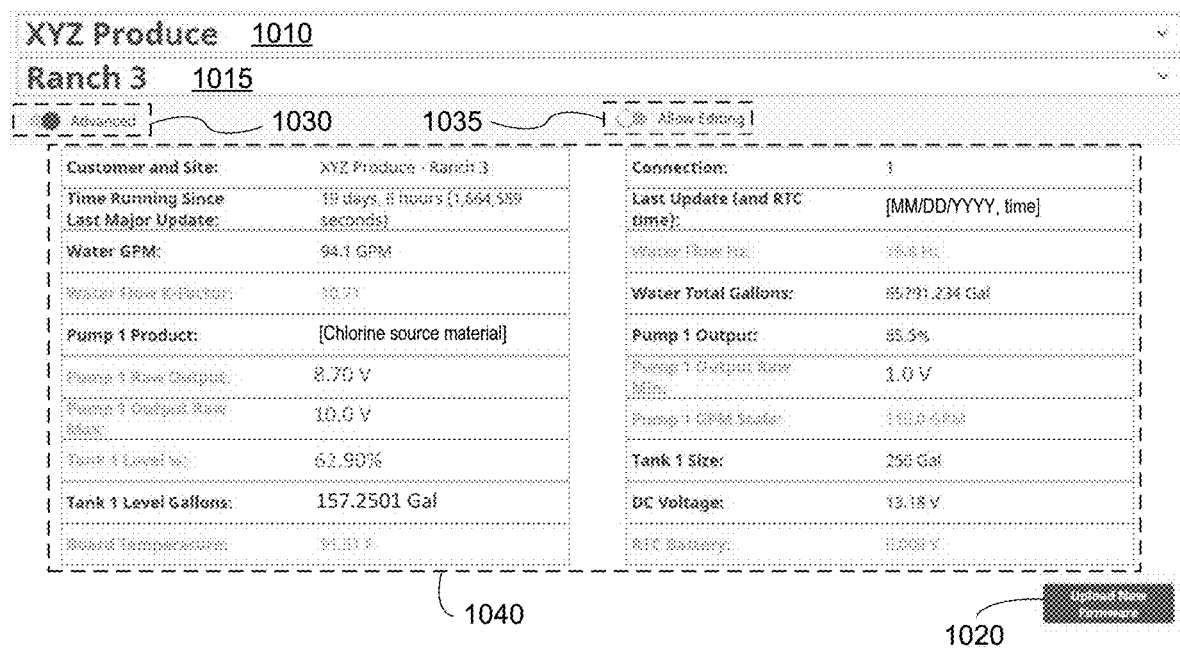

FIG. 15B shows the diagnostic interface 1000-B, shortly after the water irrigation system at XYZ Produce, Ranch 3 is turned on. The water flow rate (in GPM) has changed from zero in FIG. 15A to 94.1 in FIG. 15B. Turning on the water irrigation system also turns on the dosing pump 200 and all other electrical components in the water treatment system 100 or 300. As a result, the dosing pump raw output is 8.70 V, about 85.5% of the corresponding maximum voltage. The water flow signal value from the flow sensor 160 ("Water Flow Hz") has increased, as has total amount of water pumped through the water intake pipe 110, and the volume of the chlorine source in the storage tank 120 has decreased slightly. The board temperature also increased slightly, but insignificantly. One may monitor the temperature of the board in the control panel 250 to determine the health and/or functionality of the components therein.

Figure 15C:
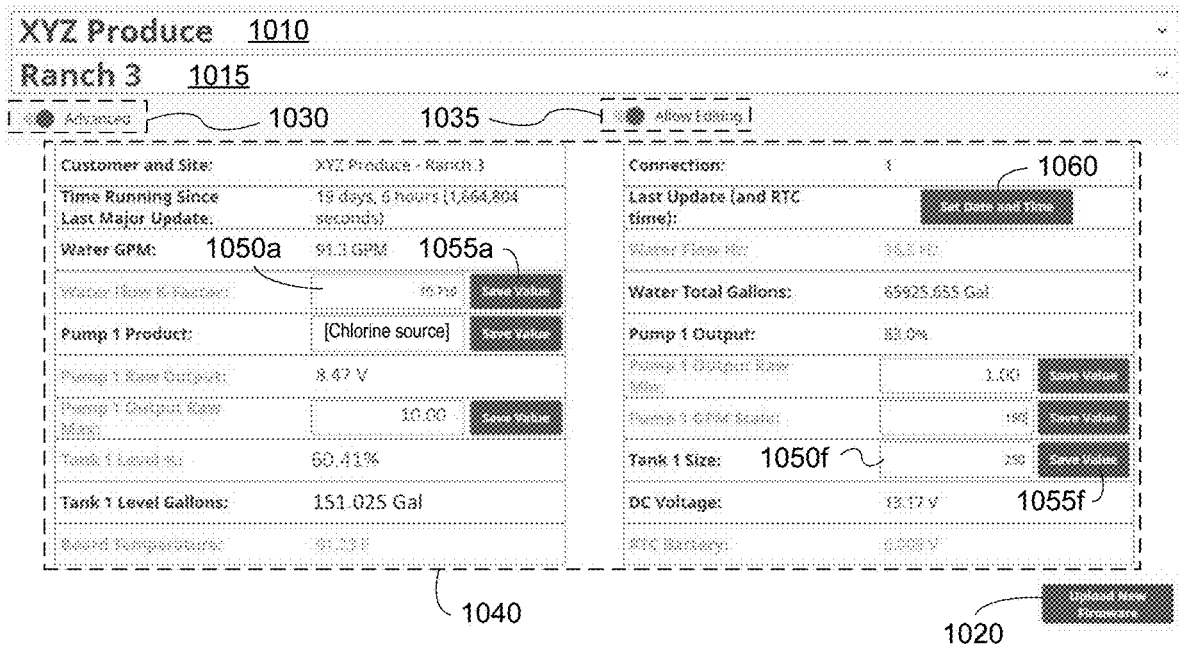

Referring now to FIG. 15C, the "allow editing" button 1035 is enabled, allowing the user to change one or more parametric values in the diagnostic data display 1040. As shown in FIG. 15C, the parametric values in the water irrigation and/or treatment system(s) that can be modified include the K factor for the water intake pipe 110, the chemical name or trade name of the chlorine source in each storage vessel 120, the minimum and maximum control voltage for each dosing pump 200, the scale of the water intake flow rate for each dosing pump 200 ("Pump 1 GPM Scale"), and the size or volume of each storage vessel 120, as indicated by the text entry fields 1050a-f and the "Save Value" buttons or icons 1055a-f. The editable diagnostic data display 1040 also includes a button or icon 1060 to set the date and time of the most recent software and/or firmware update and the button or icon 1020 for updating the firmware. In some embodiments, only the data editing screen 1000-C has the button or icon 1020. In further embodiments, other parametric values that may be modifiable include the P factor for the water intake pipe 110, the water intake flow rate (i.e., the amount of water per unit time pumped by the water intake pump 340), the output of each dosing pump 200 (as a percentage of the maximum output, the number of pulses per unit time, the time length of each pulse, etc.), etc.

To decrease the amount of chlorine source added to the irrigation water, the user increases the scale of the dosage pump 200, which increases the number of gallons or liters per pulse or stroke of the pump 200. In this case, it is increased to 150 GPM from 110 GPM in FIG. 15B. This change effectively decreases the flow rate of the chlorine source pumped by the dosing pump 200 by (150/110)−1=36%. Alternatively, for a pulse-based dosing pump 200, the flow rate of the chlorine source may be modified by changing the pulse frequency.

Figure 15D:
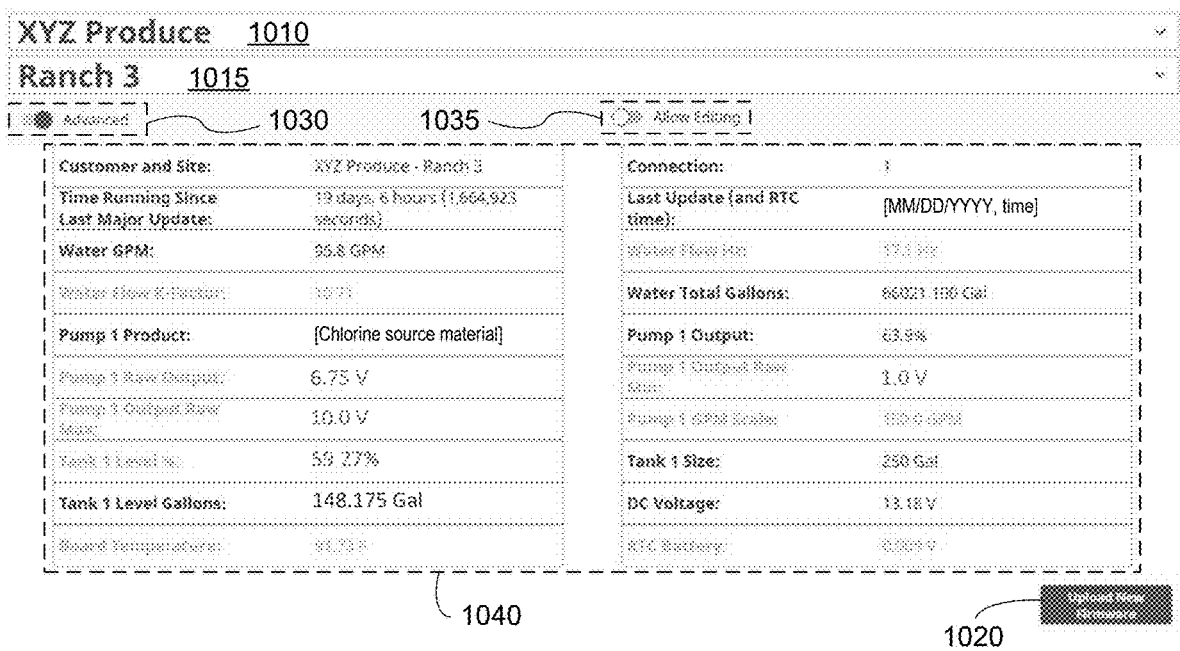

FIG. 15D shows certain changes in the diagnostic data resulting from the change in the scale of the dosing pump 200, after the editing button 1035 is disabled or turned off. For example, the scale of the dosing pump 200 remains set at 150 GPM, and the dosing pump 200 control voltage is 6.75, corresponding to an output that is now 63.9% of its maximum output water flow rate. The remaining diagnostic data 1040 is the same as, or within normal variations of, that shown in FIG. 15B.

An Exemplary Automated and/or Continuous Method of Operating, Monitoring and Maintaining an Irrigation and Water Treatment System FIG. 16 shows a flow chart 1100 for an exemplary automated and/or continuous method of operating, monitoring and maintaining an irrigation and water treatment system. At 1110, the method starts by turning on a water intake pump, which draws water from a water source (as described herein) and forces the water through a network of pipes (and optionally through a filter) to a field. The water intake pump may be started manually (i.e., at the site) or remotely (e.g., by selecting or clicking a button or icon on the user interface in a corresponding irrigation control system), as well as either on demand or according to a predetermined schedule (e.g., every Monday, Wednesday and Friday at 8:00 AM). At 1115, a pump automatically starts (e.g., at the same time as or as soon as possible after the water intake pump is started) that draws a chlorine source from a storage vessel and injects or adds the chlorine source to the water in the pipe network to disinfect the water, limit tree root growth, oxidize certain oxidizable species, etc.

As the chlorine-treated water is delivered to the field, at 1120, a user may monitor and/or measure the amount or content of the chlorine source in the storage vessel, the water intake flow rate, the status of the chlorine source pump (e.g., whether or not the dosing pump is primed), the chlorine source flow or feed rate, the total amount of the chlorine source added to the water delivered to the field over time, the residual total chlorine level at one or more outer (e.g., farthest) field points, etc. In some cases, the user (who may be as described herein) may not be able to monitor all of these parameters, such as the residual total chlorine level and/or the chlorine source flow or feed rate. The user may also monitor one or more other parameters of the irrigation and/or water treatment system, as described herein.

At 1130, the method 1100 determines the chlorine source pump prime status. In some embodiments, a combination of hardware, firmware and software monitors and reports the chlorine source pump prime status continuously and automatically, and notifies the user when the chlorine source pump loses its prime. If the chlorine source pump loses its prime, the irrigation and/or water treatment system at 1135 automatically turns off the water intake pump, to prevent delivery of potentially contaminated water to the crops in the field. The water treatment system may also transmit a notice or alarm to one or more users (e.g., other than the user actively monitoring the water treatment system) regarding the chlorine source pump losing its prime and being unable to add chlorine to the irrigation water. The chlorine source pump is re-primed (e.g., by a field technician), and the method 1100 returns to 1110 to re-start the water intake pump.

If the chlorine source pump maintains its prime (which is expected when the storage vessel has a sufficient amount of the chlorine source therein), then the method 1100 determines whether the level or amount of the chlorine source in the storage vessel is below a predetermined warning threshold (e.g., 3-10% of the total volume or height of the storage vessel) at 1140. In some embodiments, a combination of hardware, firmware and software makes the determination continuously and automatically. In other or further embodiments, when the chlorine source level or amount is less than the warning threshold, the storage vessel may be refilled with the chlorine source at 1145. Contemporaneously with monitoring the chlorine source level or amount, the method 1100 also determines at 1150 whether the storage vessel has been refilled (e.g., to an amount or level greater than the warning threshold), optionally continuously and automatically. When the storage vessel is refilled (or alternatively, the amount or level of the chlorine source in the storage vessel is greater than the warning threshold), the method 1100 returns to 1120 to monitor and/or measure one or more parameters in the irrigation and/or water treatment system.

If the storage vessel has not been refilled, then the method 1100 determines at 1160 whether the level or amount of the chlorine source in the storage vessel is below a predetermined alarm threshold (e.g., 1-5% of the total volume or height of the storage vessel, but less than the warning threshold). In some embodiments, substantially the same combination of hardware, firmware and software that determines whether the chlorine source level or amount crosses the warning threshold also makes this determination. When the chlorine source level or amount is less than the alarm threshold, the water intake pump is turned off at 1165, as the chlorine source pump prime may be lost at any time when the chlorine source level or amount is so low. Also at 1165, the storage vessel is refilled with the chlorine source, then the method 1100 returns to 1110 to re-start the water intake pump.

Returning to 1140, when the chlorine source level or amount is greater than the warning threshold, the method 1100 determines at 1170 whether an unscheduled stoppage in the intake or pumping of water from the water source has occurred. This generally occurs when the water flow and/or pressure switch(es) in the water intake pipe sense no water flow or no increase in water pressure above a "no-flow" condition. When an unscheduled stoppage in the water intake flow is determined, both the water intake pump and the chlorine source pump are turned off at 1175. The problem, if any, with the water intake pump is addressed, and the method 1100 returns to 1110 to re-start the water intake pump.

When the water intake flow is ongoing and/or unstopped, the method 1100 may determine at 1180 whether the residual total chlorine level at one or more outer field points (e.g., the farthest field point) is below a predetermined threshold (e.g., 0.1-1.0 ppm), as described herein. As long as the residual total chlorine level is above the threshold, the method 1100 returns to 1120 to monitor and/or measure parameters in the irrigation and/or water treatment system, optionally continuously and automatically. When the residual total chlorine level falls below the threshold, at 1190, the water intake pump may be turned off (e.g., to prevent delivery of potentially contaminated water to the crops in the field), and the chlorine source pump output or feed rate is increased (e.g., by the user monitoring the parametric data at 1120). Alternatively, the water intake pump may remain on at 1190 (e.g., as long as the residual chlorine level is >0), in which case the method 1100 may return to 1120 to monitor and/or measure parameters in the irrigation and/or water treatment system. In a further alternative, the firmware and/or software may automatically increase the chlorine source pump output or feed rate (e.g., by 0.5-2.0 ppm, and in one example, by 1 ppm).

Figure 17:
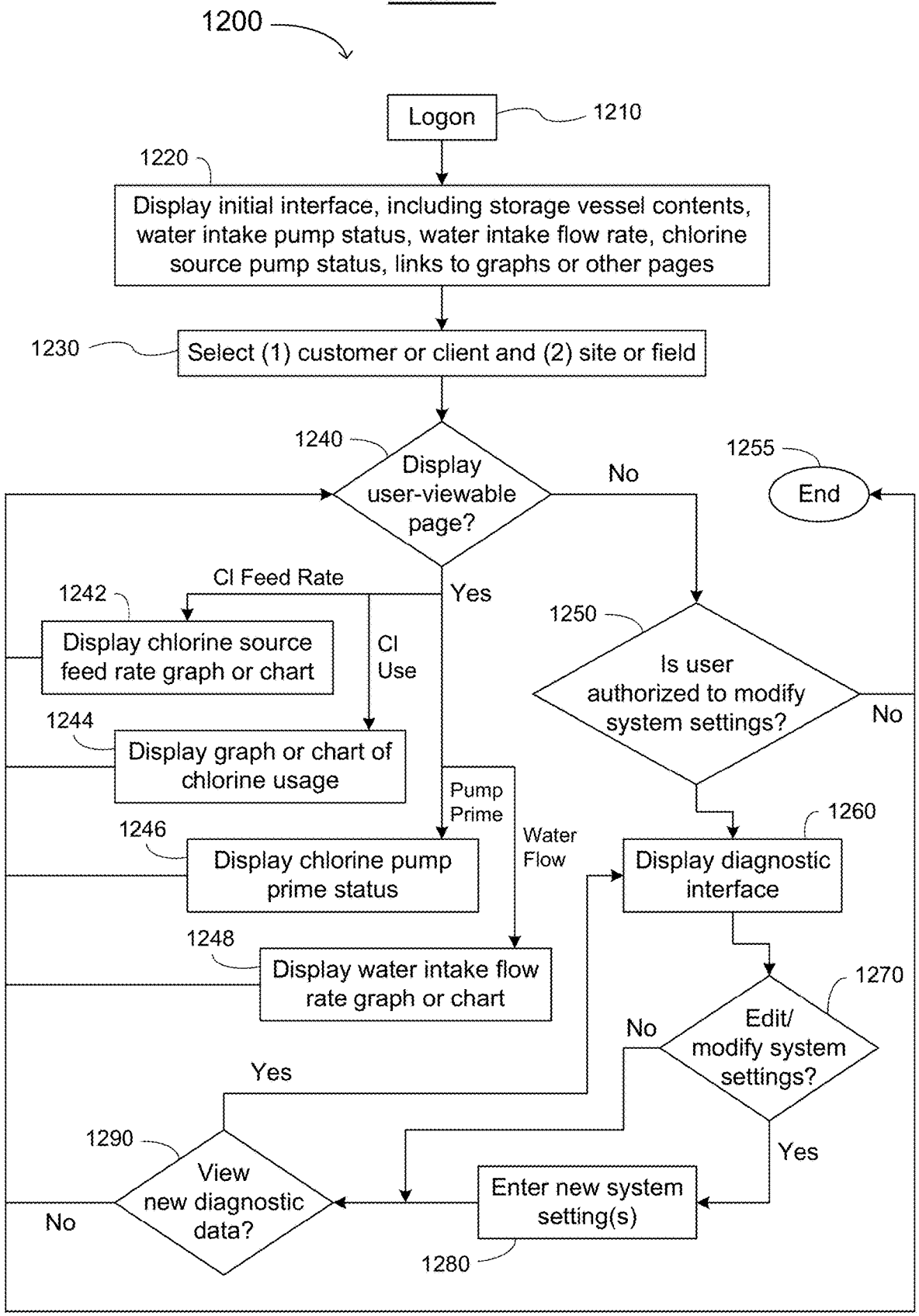
FIG. 17 is a flow chart for an exemplary automated and/or continuous method of remote monitoring and maintenance of a water treatment system, in accordance with embodiments of the present invention.

An Exemplary Automated and/or Continuous Method of Remote Monitoring and Maintenance of a Water Treatment System FIG. 17 shows a flow chart 1200 for an exemplary automated and/or continuous method of remote monitoring and maintenance of a water treatment system. At 1210, the method starts when a user (as described herein) logs on to the user interface of remote monitoring and maintenance system software installed on a server or a user terminal, as described herein. At 1220, the remote monitoring and maintenance system software automatically displays an initial interface. The initial interface shows the amount or level of the chlorine source in one or more storage vessels, the status of one or more water intake pumps and chlorine source pumps, the water intake flow rate of each water intake pump for a particular customer/client and site, one or more links to graphs or other pages, and/or pulldown menus or other mechanisms for identifying (i) the customer or client and (ii) the site or field in which the irrigation water treatment system is installed. Alternatively, any or all of this data may be viewed on one or more other pages, each of which can be selected using a corresponding button, icon, text link, or other similar mechanism. At 1230, on the initial interface, the user selects (i) the customer or client and (ii) the site or field for which parametric and/or diagnostic data is to be retrieved and/or displayed.

At 1240, the user determines whether the remote monitoring and maintenance system should display a user-viewable page. All users authorized to log on to the system may view the user-viewable pages. The user-viewable page may be a default page displayed on the initial interface, or it may show different data being monitored. The user-viewable pages other than the default page or the initial interface may be selected using a corresponding button, icon, text link, or other similar mechanism. Such pages may show the chlorine source feed or flow rate, the total volume or mass of chlorine source usage or consumption, the status of the chlorine source (e.g., dosing) pump, the water intake flow rate and/or pressure, the residual total chlorine level at one or more outer or farthest field points, etc.

For example, if the user wants to see the chlorine source feed or flow rate, the user selects the corresponding page at 1242. If the user wants to see the total chlorine source usage or consumption, the user selects the corresponding page at 1244. If the user wants to see the status (e.g., primed or not primed) of the chlorine source pump, the user selects the corresponding page at 1246. If the user wants to see the water intake flow rate, the user selects the corresponding page at 1248. Each such page shows the current value of the parameter, and may allow the user to view historical data for the parameter over time (e.g., between two dates). The parametric data may be displayed as a graph (e.g., a bar graph or a line graph), or as a chart or table (e.g., with the parametric data and the corresponding date and time that the data was determined organized in rows and columns).

At 1250, the system determines whether the user is authorized to view additional data and/or pages (e.g., including diagnostic data and/or one or more pages for editing settings on certain equipment in the irrigations and/or water treatment systems), although this step may be performed at 1210 when the user logs into the system. If the user does not wish to see a user-viewable page and does not have authority to view diagnostic data or to modify or edit equipment or other system settings, then the method 1200 ends at 1255.

However, if the user has authority to view diagnostic data and modify or edit equipment and/or other system settings, then the method 1200 displays a diagnostic interface at 1260.

The diagnostic interface may show the customer or client name, the field or site name, pulldown menus for selecting a different customer/client or field/site, buttons or icons for updating the firmware, selecting between different displays (e.g., a basic display and an advanced display), and enabling editing or modification of certain parametric values in the water treatment system. The diagnostic interface may also show certain parametric data such as the status of the connection between the server and the water treatment system, the time elapsed since the most recent software and/or firmware update, the date and time of the most recent communication from the water treatment system, the water intake flow rate, the reading from the water flow sensor/meter, the K or P factor for the water intake pipe, the total amount of water pumped by the water intake pump, the chemical name or trade name of the chlorine source in each storage vessel at the site, one or more settings in the hardware and/or circuitry of the chlorine source pump, the output (e.g., flow rate or feed rate) of each chlorine source pump at the site, the output of each chlorine source pump as a percentage of its maximum output, minimum and maximum settings for the chlorine source pump parameter that controls the corresponding flow rate, the amount of the chlorine source in each storage vessel (e.g., as a percentage of the total volume of the storage vessel and/or as an absolute volume or mass), the size or volume of each storage vessel at the site, the DC voltage being supplied to the control panel and/or controller, the temperature of the control panel or the board on which the controller is mounted, and the voltage of one or more batteries in the system (e.g., a back-up battery in case of a loss of AC power to the system, the battery powering a real-time clock, etc.), the water pressure in the water intake pipe, the residual total chlorine level at one or more outer or farthest field points, etc.

The authorized user may choose to edit or modify one or more of the system settings at 1270, as described herein. When the authorized user chooses to edit or modify one or more of the system settings, the authorized user does so at 1280. After entering the new setting(s), or if the authorized user chooses not to edit or modify any of the system settings, the authorized user can decide whether to view new or different diagnostic data at 1290. If so, the method 1200 returns to 1260 to display the new/updated or different diagnostic interface (or display). If not, the authorized user can either return to 1240, for example to determine which user-viewable page to display, or the authorized user can end the method 1200 at 1255.

CONCLUSION/SUMMARY

Thus, the present invention provides a system, computer-readable medium and method for sanitation or decontamination of irrigation water with a chlorine source that assures that there is always enough chlorine in the irrigation water to kill sufficient microbiological organisms in the water to bring the level of microbiological loading to those deemed safe for certain purposes (e.g., food safety) by applicable regulations or standards, while still being economical for the grower or other user of the irrigation system. The automated and/or computerized system and method reduces or virtually eliminates the risks of not adding chlorine at the proper level to sanitize the irrigation system throughout its entire length. If a fault or issue arises, the present invention automatically notifies responsive personnel and/or shuts down the irrigation and chlorine delivery system(s) until the fault or issue is rectified.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A water treatment system, comprising:
 a water pump configured to supply water from a water source to an intake pipe;
 a chlorine source pump having a prime status of either primed or not primed, the chlorine source pump being configured to supply a chlorine source from a storage vessel to a chlorine source feed line when the chlorine source pump is primed, but not being able to supply the chlorine source from the storage vessel to the chlorine source feed line when the chlorine source pump is not primed, and the chlorine source feed line providing the chlorine source to the intake pipe;
 a water flow and/or pressure switch configured to detect a positive water flow and/or pressure in the intake pipe;
 a chlorine flow monitor configured to detect (i) the prime status of the chlorine source pump and (ii) a flow of the chlorine source in the chlorine source feed line; and
 logic or circuitry configured to receive one or more signals from each of (I) the water flow and/or pressure switch and (II) the chlorine flow monitor, wherein:
  when (a) the water flow and/or pressure switch detects the positive water flow and/or pressure in the intake pipe and (b1) the chlorine flow monitor detects that the prime status of the chlorine source pump is not primed, the logic or circuitry notifies one or more users and automatically disables or turns off the water pump; and
  when (a) the water flow and/or pressure switch detects the positive water flow and/or pressure in the intake pipe and (b2) the chlorine flow monitor detects that there is no flow in the chlorine source feed line, the logic or circuitry notifies the one or more users and automatically disables or turns off the water pump.

2. The water treatment system of claim 1, wherein the positive water flow and/or pressure in the intake pipe is the positive water flow, the water treatment system further comprises a water flow sensor configured to provide a flow rate signal corresponding to a rate of the positive water flow in the intake pipe to the logic or circuitry, the flow rate signal having a value corresponding to the rate of the positive water flow, and the logic or circuitry instructs the chlorine source pump to provide the chlorine source to the chlorine source feed line at a chlorine feed rate dependent on the rate of the positive water flow and a target concentration of the chlorine source in the water in the intake pipe.

3. The water treatment system of claim 2, further comprising:
 a remote computer or server configured to receive and display information from the logic or circuitry regarding the positive water flow in the intake pipe, the rate of the positive water flow, the chlorine feed rate, and the prime status; and a wireless modem or gateway configured to wirelessly communicate the information from the logic or circuitry to the remote computer or server.

4. The water treatment system of claim 3, wherein the remote computer or server is further configured to wirelessly transmit settings information to the logic or circuitry, wherein the settings information comprises a pulse rate or pulse frequency of the chlorine source pump and a scale factor, the scale factor corresponding to the target concentration of the chlorine source in the water in the intake pipe.

5. The water treatment system of claim 1, further comprising a level sensor configured to determine a level of the chlorine source in the storage vessel and provide a chlorine level signal corresponding to the level of the chlorine source in the storage vessel to the logic or circuitry, wherein the logic or circuitry is further configured to determine an amount of the chlorine source in the storage vessel from the chlorine level signal.

6. The water treatment system of claim 1, further comprising a pulse controller configured to control a pulse or stroke rate of the chlorine source pump and a pulse volume control configured to control a volume of each pulse or stroke of the chlorine source pump.

7. The water treatment system of claim 1, wherein the intake pipe comprises a water source intake pipe configured to receive the water from the water pump, one or more filters configured to remove particulate matter having a predetermined minimum size from the water in the water source intake pipe, and a treated water supply pipe configured to supply filtered water from the one or more filters to a downstream location, and the chlorine source feed line provides the chlorine source to the treated water supply pipe.

8. The water treatment system of claim 1, wherein the logic or circuitry comprises a programmable logic controller, embedded logic circuitry, a microcontroller, a microprocessor, or a programmable logic device.

9. The water treatment system of claim 8, wherein the logic or circuitry further comprises a memory storing a set of instructions therein and adapted to: turn on the chlorine source pump to supply the chlorine source from the storage vessel through the chlorine source feed line to the intake pipe when the positive water flow and/or pressure is detected in the intake pipe, turn off the chlorine source pump to discontinue the supply of the chlorine source when (a1) the positive water flow and/or pressure in the intake pipe is not detected and (b1) the chlorine source pump is not primed, and turn off the chlorine source pump to discontinue the supply of the chlorine source when (a1) the positive water flow and/or pressure in the intake pipe is not detected and (b2) there is no flow of the chlorine source in the chlorine source feed line.

10. The water treatment system of claim 1, wherein the chlorine source pump comprises a dosing pump having a diaphragm section connected to the chlorine flow monitor.

11. The water treatment system of claim 10, further comprising a pulse controller configured to control a pulse rate of the chlorine source pump.

12. The water treatment system of claim 1, wherein the chlorine flow monitor comprises a magnetic switch sensor that determines the prime status of the chlorine source pump and sends a signal to the logic or circuitry indicating the prime status.

13. The water treatment system of claim 1, further comprising an ultrasonic sensor in electronic communication with the logic or circuitry, wherein the ultrasonic sensor is configured to determine a distance or level of a surface of the chlorine source in the storage vessel, and the logic or circuitry is configured to calculate an amount of the chlorine source in the storage vessel from the distance or level.

14. The water treatment system of claim 13, wherein when the distance or level of the surface of the chlorine source in the storage vessel is below a predetermined minimum, the logic or circuitry generates a chlorine source level alarm.

15. The water treatment system of claim 1, wherein the water flow and/or pressure switch comprises an in-line roto-wheel meter, a paddle switch and/or an adjustable pressure switch in the intake pipe, the in-line roto-wheel meter being configured to determine a water flow rate in the intake pipe, the paddle switch being configured to send an active signal to the logic or circuitry indicating that the water is flowing in the intake pipe when the water flow rate is greater than a predetermined threshold, and the adjustable pressure switch being configured to send a signal to the logic or circuitry when the pressure in the intake pipe is greater than 1.02 atm.

16. The water treatment system of claim 15, wherein the logic or circuitry comprises a control mechanism configured to turn off the chlorine source pump when the water flow and/or pressure switch detect no water flow in the intake pipe.

17. The water treatment system of claim 15, wherein the logic or circuitry monitors the water flow rate in the intake pipe, a feed rate of the chlorine source pump, and a level of the chlorine source in the storage vessel, and automatically turns off the water pump along with the chlorine source pump when there is no flow from the chlorine source pump.

18. The water treatment system of claim 1, wherein the logic or circuitry comprises monitoring and/or control logic configured to monitor and/or control (I) the water flow and/or pressure switch and (II) the chlorine flow monitor, a modem or gateway configured to transmit data from the logic or circuitry to an external server, and a pump controller configured to control a flow rate of the chlorine source pump.

19. The water treatment system of claim 18, wherein the logic or circuitry further comprises a first memory configured to store messages from the monitoring and/or control logic to the external server, an electrically erasable and programmable memory configured to store parameter values, target values and thresholds, and instructions, a level sensor and/or usage monitor configured to determine an amount and/or feed rate of the chlorine source from the storage vessel, an alarm control/logic block configured to automatically send warnings and alarms to the external server in response to any of a plurality of predetermined conditions, a flow rate conversion block configured to convert a signal from the water flow and/or pressure switch to a water flow rate, a real time clock (RTC), and a non-volatile random access memory (NVRAM) configured to store information and/or data when no power is provided to the logic or circuitry.

20. The water treatment system of claim 12, wherein the magnetic switch sensor comprises a prime detector that detects loss of prime in the chlorine source pump and sends an active signal to an alarm control block and main monitoring logic in the logic or circuitry by closing an otherwise open circuit.

21. The water treatment system of claim 1, wherein the chlorine flow monitor comprises a prime detector that detects the prime status of the chlorine source pump, and when the prime status is not primed, the prime detector sends an active signal to an alarm control block and main monitoring logic in the logic or circuitry by closing an otherwise open circuit.

\* \* \* \* \*